(12) United States Patent  (10) Patent No.: US 9,075,136 B1
Joao  (45) Date of Patent: Jul. 7, 2015

(54) VEHICLE OPERATOR AND/OR OCCUPANT INFORMATION APPARATUS AND METHOD

(75) Inventor: Raymond Anthony Joao, Yonkers, NY (US)

(73) Assignee: GTJ VENTURES, LLC, Yonkers, NY (US)

(*) Notice: Subject to any disclaimer, the term of this patent is extended or adjusted under 35 U.S.C. 154(b) by 374 days.

(21) Appl. No.: 09/259,957

(22) Filed: Mar. 1, 1999

Related U.S. Application Data

(60) Provisional application No. 60/076,800, filed on Mar. 4, 1998.

(51) Int. Cl.
  *H04N 7/18* (2006.01)
  *G01S 11/12* (2006.01)
  *B63B 49/00* (2006.01)

(52) U.S. Cl.
  CPC *G01S 11/12* (2013.01); *B63B 49/00* (2013.01)

(58) Field of Classification Search
  CPC ..... G01S 11/12; G06K 9/00791; B63B 45/02
  USPC .......... 348/113–117, 118, 142–160; 725/105; 701/117; 342/41
  See application file for complete search history.

(56) References Cited

U.S. PATENT DOCUMENTS

| | | | |
|---|---|---|---|
| 2,674,352 A | 4/1954 | Braun, Sr. | |
| 3,482,037 A | 12/1969 | Brown, et al. | |
| 3,656,111 A | 4/1972 | Royster, Sr. | |
| 3,669,288 A | 6/1972 | Young | |
| 4,003,045 A | 1/1977 | Stockdale | |
| 4,030,088 A | 6/1977 | McCullough | |
| 4,050,301 A | 9/1977 | Cushing | |
| 4,064,509 A | 12/1977 | Stockdale | |
| 4,067,411 A | 1/1978 | Conley et al. | |
| 4,074,248 A | 2/1978 | Stockdale | |
| 4,100,543 A | 7/1978 | Stockdale et al. | |
| 4,137,429 A | 1/1979 | Stockdale | |

(Continued)

FOREIGN PATENT DOCUMENTS

| CA | 1277400 | 12/1990 |
|---|---|---|
| DE | 4423328 | 1/1996 |

(Continued)

OTHER PUBLICATIONS

"Onstar" at http://onstar.internetpressroom.com, pp. 1-37, Oct. 24, 2001.*

(Continued)

*Primary Examiner* — Andy Rao
(74) *Attorney, Agent, or Firm* — Raymond A. Joao, Esq.

(57) ABSTRACT

An apparatus including a processing device which identifies a first travel route, on which first travel route a vehicle can travel to a destination, and which generates a first message containing information regarding the first travel route, and a transmitter which transmits the first message to a communication device located at the vehicle. The apparatus automatically detects a departure of the vehicle from the first travel route, identifies a second travel route in response to the detected departure of the vehicle from the first travel route, generates a second message containing information regarding the second travel route, and transmits the second message to the communication device.

98 Claims, 6 Drawing Sheets

(56) References Cited

U.S. PATENT DOCUMENTS

| | | |
|---|---|---|
| 4,137,553 A | 1/1979 | Tokitsu et al. |
| 4,138,657 A | 2/1979 | Shave |
| 4,145,581 A | 3/1979 | Stockdale |
| 4,156,235 A | 5/1979 | Stockdale |
| 4,156,286 A | 5/1979 | Connors et al. |
| 4,177,466 A | 12/1979 | Reagan |
| 4,191,948 A | 3/1980 | Stockdale |
| 4,201,908 A | 5/1980 | Johnson et al. |
| 4,206,449 A | 6/1980 | Galvin et al. |
| 4,216,375 A | 8/1980 | Ulch et al. |
| 4,227,588 A | 10/1980 | Biancardi |
| 4,236,215 A | 11/1980 | Callahan et al. |
| 4,257,063 A | 3/1981 | Loughry et al. |
| 4,258,421 A | 3/1981 | Juhasz et al. |
| 4,263,945 A | 4/1981 | Van Ness |
| 4,325,079 A | 4/1982 | Little |
| 4,326,221 A | 4/1982 | Mallos et al. |
| 4,333,093 A | 6/1982 | Raber et al. |
| 4,337,651 A | 7/1982 | Yoshino et al. |
| 4,347,590 A | 8/1982 | Heger et al. |
| 4,378,574 A | 3/1983 | Stephenson |
| 4,402,050 A | 8/1983 | Tagami et al. |
| 4,409,670 A | 10/1983 | Herndon et al. |
| 4,420,238 A | 12/1983 | Felix |
| 4,442,319 A | 4/1984 | Treidl |
| 4,454,583 A | 6/1984 | Schneiderhan et al. |
| 4,455,550 A | 6/1984 | Iguchi |
| 4,470,116 A | 9/1984 | Ratchford |
| 4,489,387 A | 12/1984 | Lamb et al. |
| 4,491,690 A | 1/1985 | Daley |
| 4,498,075 A | 2/1985 | Gaudio |
| 4,511,886 A | 4/1985 | Rodriguez |
| 4,517,565 A | 5/1985 | Nakamura et al. |
| 4,521,777 A | 6/1985 | Nakamura et al. |
| 4,522,146 A | 6/1985 | Carlson |
| 4,524,243 A | 6/1985 | Shapiro |
| 4,550,317 A | 10/1985 | Moriyama et al. |
| 4,554,584 A | 11/1985 | Elam et al. |
| 4,574,305 A | 3/1986 | Campbell et al. |
| 4,591,823 A | 5/1986 | Horvat |
| 4,596,988 A | 6/1986 | Wanka |
| 4,602,127 A | 7/1986 | Neely et al. |
| 4,604,711 A | 8/1986 | Benn et al. |
| 4,619,231 A | 10/1986 | Stolar et al. |
| 4,622,541 A | 11/1986 | Stockdale |
| 4,623,320 A | 11/1986 | Kakizaki et al. |
| 4,630,065 A | 12/1986 | Ichikawa |
| 4,638,289 A | 1/1987 | Zottnik |
| 4,644,478 A | 2/1987 | Stephens et al. |
| 4,644,494 A | 2/1987 | Muller |
| 4,645,872 A | 2/1987 | Pressman et al. |
| 4,651,143 A | 3/1987 | Yamanaka |
| 4,656,475 A | 4/1987 | Miller et al. |
| 4,656,585 A | 4/1987 | Stephenson |
| 4,660,037 A | 4/1987 | Nakamura |
| 4,660,145 A | 4/1987 | Hansen |
| 4,671,111 A | 6/1987 | Lemelson |
| 4,673,937 A | 6/1987 | Davis |
| 4,677,429 A | 6/1987 | Glotzbach |
| 4,682,292 A | 7/1987 | Bue et al. |
| 4,709,265 A | 11/1987 | Silverman et al. |
| 4,710,917 A | 12/1987 | Tompkins et al. |
| 4,721,954 A | 1/1988 | Mauch |
| 4,729,102 A | 3/1988 | Miller, Jr. et al. |
| 4,733,215 A | 3/1988 | Memmola |
| 4,749,992 A | 6/1988 | Fitzemeyer et al. |
| 4,760,547 A | 7/1988 | Duxbury |
| 4,768,087 A | 8/1988 | Taub et al. |
| 4,768,740 A | 9/1988 | Corrie |
| 4,772,875 A | 9/1988 | Maddox et al. |
| 4,775,028 A | 10/1988 | De Heering |
| 4,785,404 A | 11/1988 | Sims et al. |
| 4,785,472 A | 11/1988 | Shapiro |
| 4,789,904 A | 12/1988 | Peterson |
| 4,804,937 A | 2/1989 | Barbiaux et al. |
| 4,812,843 A | 3/1989 | Champion, III et al. |
| 4,818,998 A | 4/1989 | Apsell et al. |
| 4,821,118 A | 4/1989 | Lafreniere |
| 4,831,438 A | 5/1989 | Bellman, Jr. et al. |
| 4,831,539 A | 5/1989 | Hagenbuch |
| 4,833,450 A | 5/1989 | Buccola et al. |
| 4,835,546 A | 5/1989 | Keller |
| 4,837,798 A | 6/1989 | Cohen et al. |
| 4,838,275 A | 6/1989 | Lee |
| 4,841,815 A | 6/1989 | Takahashi |
| 4,847,781 A | 7/1989 | Brown, III et al. |
| 4,853,850 A | 8/1989 | Krass, Jr. et al. |
| 4,857,912 A | 8/1989 | Everett, Jr. et al. |
| 4,860,112 A | 8/1989 | Nichols et al. |
| 4,876,597 A | 10/1989 | Roy et al. |
| 4,878,175 A | 10/1989 | Norden-Paul et al. |
| 4,882,579 A | 11/1989 | Siwiak |
| 4,882,743 A | 11/1989 | Mahmoud |
| 4,882,746 A | 11/1989 | Shimada |
| 4,891,650 A | 1/1990 | Sheffer |
| 4,893,240 A | 1/1990 | Karkouti |
| 4,896,580 A | 1/1990 | Rudnicki |
| 4,897,630 A | 1/1990 | Nykerk |
| 4,908,629 A | 3/1990 | Apsell et al. |
| 4,918,615 A | 4/1990 | Suzuki et al. |
| 4,931,793 A | 6/1990 | Fuhrmann et al. |
| 4,937,569 A | 6/1990 | Trask et al. |
| 4,939,522 A | 7/1990 | Newstead et al. |
| 4,940,964 A | 7/1990 | Dao |
| 4,945,410 A | 7/1990 | Walling |
| 4,949,372 A | 8/1990 | Steele |
| 4,951,147 A | 8/1990 | Aknar et al. |
| 4,954,886 A | 9/1990 | Elberbaum |
| 4,958,454 A | 9/1990 | Chan et al. |
| 4,959,713 A | 9/1990 | Morotomi et al. |
| 4,962,522 A | 10/1990 | Marian |
| 4,963,995 A | 10/1990 | Lang |
| 4,967,195 A | 10/1990 | Shipley |
| 4,968,978 A | 11/1990 | Stolarczyk |
| 4,986,384 A | 1/1991 | Okamoto et al. |
| 4,988,992 A | 1/1991 | Heitschel et al. |
| 4,989,146 A | 1/1991 | Imajo |
| 4,991,123 A | 2/1991 | Casamassima |
| 5,000,139 A | 3/1991 | Wong |
| 5,002,491 A | 3/1991 | Abrahamson et al. |
| 5,003,317 A | 3/1991 | Gray et al. |
| 5,005,126 A | 4/1991 | Haskin |
| 5,006,840 A | 4/1991 | Hamada et al. |
| 5,008,840 A | 4/1991 | DePierro |
| 5,014,206 A | 5/1991 | Scribner et al. |
| 5,025,253 A | 6/1991 | DiLullo et al. |
| 5,027,104 A | 6/1991 | Reid |
| 5,031,103 A | 7/1991 | Kamimura et al. |
| 5,032,845 A | 7/1991 | Velasco |
| 5,054,569 A | 10/1991 | Scott et al. |
| 5,055,851 A | 10/1991 | Sheffer |
| 5,056,056 A | 10/1991 | Gustin |
| 5,056,136 A | 10/1991 | Smith |
| 5,057,932 A | 10/1991 | Lang |
| 5,058,423 A | 10/1991 | Ozaki et al. |
| 5,061,916 A | 10/1991 | French et al. |
| 5,065,321 A | 11/1991 | Bezos et al. |
| 5,068,656 A | 11/1991 | Sutherland |
| 5,075,527 A | 12/1991 | Ikuma |
| 5,079,538 A | 1/1992 | DeFino et al. |
| 5,081,667 A | 1/1992 | Drori et al. |
| 5,083,106 A | 1/1992 | Kostusiak et al. |
| 5,084,828 A | 1/1992 | Kaufman et al. |
| 5,086,385 A | 2/1992 | Launey et al. |
| 5,097,253 A | 3/1992 | Eschbach et al. |
| 5,099,245 A | 3/1992 | Sagey |
| 5,113,185 A | 5/1992 | Ichikawa |
| 5,113,427 A | 5/1992 | Ryoichi et al. |
| 5,115,678 A | 5/1992 | Ozaki et al. |
| 5,119,102 A | 6/1992 | Barnard |
| 5,119,412 A | 6/1992 | Attallah |
| 5,128,874 A | 7/1992 | Bhanu et al. |
| 5,129,376 A | 7/1992 | Parmley |
| 5,132,992 A | 7/1992 | Yurt et al. |

(56) References Cited

U.S. PATENT DOCUMENTS

| | | | |
|---|---|---|---|
| 5,133,079 | A | 7/1992 | Ballantyne et al. |
| 5,133,081 | A | 7/1992 | Mayo |
| 5,138,649 | A | 8/1992 | Krisbergh et al. |
| 5,144,661 | A | 9/1992 | Shamosh et al. |
| 5,155,683 | A | 10/1992 | Rahim |
| 5,155,689 | A | 10/1992 | Wortham |
| 5,157,491 | A | 10/1992 | Kassatly |
| 5,164,839 | A | 11/1992 | Lang |
| 5,168,170 | A | 12/1992 | Hartig |
| 5,173,855 | A | 12/1992 | Nielsen et al. |
| 5,173,932 | A | 12/1992 | Johansson et al. |
| 5,177,604 | A | 1/1993 | Martinez |
| 5,189,396 | A | 2/1993 | Stobbe |
| 5,192,999 | A | 3/1993 | Graczyk et al. |
| 5,195,126 | A | 3/1993 | Carrier et al. |
| 5,202,759 | A | 4/1993 | Laycock |
| 5,206,934 | A | 4/1993 | Naef, III |
| 5,208,756 | A | 5/1993 | Song |
| 5,210,873 | A | 5/1993 | Gay et al. |
| 5,216,596 | A | 6/1993 | Weinstein |
| 5,218,367 | A | 6/1993 | Sheffer et al. |
| 5,223,816 | A | 6/1993 | Levinson et al. |
| 5,223,844 | A | 6/1993 | Mansell et al. |
| 5,224,211 | A | 6/1993 | Roe |
| 5,225,842 | A | 7/1993 | Brown et al. |
| 5,229,850 | A | 7/1993 | Toyoshima |
| 5,229,941 | A | 7/1993 | Hattori |
| 5,239,468 | A | 8/1993 | Sewersky et al. |
| 5,239,674 | A | 8/1993 | Comroe et al. |
| 5,247,439 | A | 9/1993 | Gurmu et al. |
| 5,247,564 | A | 9/1993 | Zicker |
| 5,253,275 | A | 10/1993 | Yurt et al. |
| 5,260,874 | A | 11/1993 | Berner et al. |
| 5,262,875 | A | 11/1993 | Mincer et al. |
| 5,263,396 | A | 11/1993 | Ladan et al. |
| 5,272,465 | A | 12/1993 | Meares, Jr. |
| 5,276,728 | A | 1/1994 | Pagliaroli et al. |
| 5,278,539 | A | 1/1994 | Lauterbach et al. |
| 5,278,547 | A | 1/1994 | Suman et al. |
| 5,281,367 | A | 1/1994 | Schleck et al. |
| 5,283,643 | A | 2/1994 | Fujimoto |
| 5,287,398 | A | 2/1994 | Briault |
| 5,291,414 | A | 3/1994 | Tamai et al. |
| 5,295,551 | A | 3/1994 | Sukonick |
| 5,299,132 | A | 3/1994 | Wortham |
| 5,303,042 | A | 4/1994 | Lewis et al. |
| 5,307,058 | A | 4/1994 | Tokizane et al. |
| 5,310,349 | A | 5/1994 | Daniels et al. |
| 5,311,434 | A | 5/1994 | Tamai |
| 5,313,201 | A | 5/1994 | Ryan |
| 5,315,515 | A | 5/1994 | Schmitz |
| 5,315,711 | A | 5/1994 | Barone et al. |
| 5,317,323 | A | 5/1994 | Kennedy et al. |
| 5,318,450 | A | 6/1994 | Carver |
| 5,319,355 | A | 6/1994 | Russek |
| 5,321,396 | A | 6/1994 | Lamming et al. |
| 5,321,615 | A | 6/1994 | Frisbie et al. |
| 5,331,577 | A | 7/1994 | Grimes |
| 5,334,974 | A | 8/1994 | Simms et al. |
| 5,347,306 | A | 9/1994 | Nitta |
| 5,353,034 | A | 10/1994 | Sato et al. |
| 5,366,896 | A | 11/1994 | Margrey et al. |
| 5,370,201 | A | 12/1994 | Inubushi |
| 5,373,282 | A | 12/1994 | Carter |
| 5,381,412 | A | 1/1995 | Otani |
| 5,382,943 | A | 1/1995 | Tanaka |
| 5,382,948 | A | 1/1995 | Richmond |
| 5,388,101 | A | 2/1995 | Dinkins |
| 5,389,935 | A | 2/1995 | Drouault et al. |
| 5,392,052 | A | 2/1995 | Eberwine |
| 5,396,216 | A | 3/1995 | Morgan |
| 5,400,018 | A | 3/1995 | Scholl et al. |
| 5,406,491 | A | 4/1995 | Lima |
| 5,410,343 | A | 4/1995 | Coddington et al. |
| 5,412,660 | A | 5/1995 | Chen et al. |
| 5,412,708 | A | 5/1995 | Katz |
| 5,418,537 | A | 5/1995 | Bird |
| 5,424,940 | A | 6/1995 | Ousborne |
| 5,428,546 | A | 6/1995 | Shah et al. |
| 5,430,432 | A | 7/1995 | Camhi et al. |
| 5,430,656 | A | 7/1995 | Dekel et al. |
| 5,432,495 | A | 7/1995 | Tompkins |
| 5,432,841 | A | 7/1995 | Rimer |
| 5,434,973 | A | 7/1995 | Lu |
| 5,436,960 | A | 7/1995 | Campana, Jr. et al. |
| 5,438,517 | A | 8/1995 | Sennott et al. |
| 5,440,334 | A | 8/1995 | Walters et al. |
| 5,441,047 | A | 8/1995 | David et al. |
| 5,442,553 | A | 8/1995 | Parrillo |
| 5,445,347 | A | 8/1995 | Ng |
| 5,446,445 | A | 8/1995 | Bloomfield et al. |
| 5,446,659 | A | 8/1995 | Yamawaki |
| 5,448,218 | A | 9/1995 | Espinosa |
| 5,453,730 | A | 9/1995 | De-Grinis et al. |
| 5,457,597 | A | 10/1995 | Rothschild |
| 5,457,630 | A | 10/1995 | Palmer |
| 5,458,494 | A | 10/1995 | Krohn et al. |
| 5,461,372 | A | 10/1995 | Busak et al. |
| 5,463,554 | A | 10/1995 | Araki et al. |
| 5,465,115 | A | 11/1995 | Conrad et al. |
| 5,475,597 | A | 12/1995 | Buck |
| 5,479,206 | A | 12/1995 | Ueno et al. |
| 5,490,247 | A | 2/1996 | Tung et al. |
| 5,497,419 | A | 3/1996 | Hill |
| 5,508,733 | A | 4/1996 | Kassatly |
| 5,508,736 | A | 4/1996 | Cooper |
| 5,508,917 | A | 4/1996 | Siegle et al. |
| 5,509,009 | A | 4/1996 | Laycock et al. |
| 5,510,828 | A | 4/1996 | Lutterbach et al. |
| 5,510,832 | A | 4/1996 | Garcia |
| 5,512,902 | A | 4/1996 | Guthrie et al. |
| 5,513,107 | A | 4/1996 | Gormley |
| 5,513,244 | A | 4/1996 | Joao et al. |
| 5,515,043 | A | 5/1996 | Berard et al. |
| 5,515,285 | A | 5/1996 | Garrett, Sr. et al. |
| 5,519,669 | A | 5/1996 | Ross et al. |
| 5,523,765 | A * | 6/1996 | Ichikawa ................... 342/451 |
| 5,523,816 | A | 6/1996 | Sherman, Jr. et al. |
| 5,523,950 | A | 6/1996 | Peterson |
| 5,526,269 | A | 6/1996 | Ishibashi et al. |
| 5,528,281 | A | 6/1996 | Grady et al. |
| 5,533,589 | A | 7/1996 | Critzer |
| 5,535,278 | A | 7/1996 | Cahn et al. |
| 5,537,141 | A | 7/1996 | Harper et al. |
| 5,537,143 | A | 7/1996 | Steingold et al. |
| 5,541,585 | A | 7/1996 | Duhame et al. |
| 5,543,778 | A | 8/1996 | Stouffer |
| 5,544,036 | A | 8/1996 | Brown, Jr. et al. |
| 5,544,649 | A | 8/1996 | David et al. |
| 5,547,149 | A | 8/1996 | Kalberer et al. |
| 5,548,753 | A | 8/1996 | Linstead et al. |
| 5,550,738 | A | 8/1996 | Bailey et al. |
| 5,550,863 | A | 8/1996 | Yurt et al. |
| 5,553,589 | A | 9/1996 | Middleton et al. |
| 5,553,609 | A | 9/1996 | Chen et al. |
| 5,557,254 | A | 9/1996 | Johnson et al. |
| 5,557,522 | A | 9/1996 | Nakayama et al. |
| 5,559,511 | A | 9/1996 | Ito et al. |
| 5,559,707 | A | 9/1996 | DeLorme et al. |
| 5,563,453 | A | 10/1996 | Nyfelt |
| 5,566,084 | A | 10/1996 | Cmar |
| 5,568,535 | A | 10/1996 | Sheffer et al. |
| 5,572,438 | A | 11/1996 | Ehlers et al. |
| 5,577,689 | A | 11/1996 | Haro |
| 5,581,297 | A | 12/1996 | Koz et al. |
| 5,586,130 | A | 12/1996 | Doyle |
| 5,587,715 | A | 12/1996 | Lewis |
| 5,588,038 | A | 12/1996 | Snyder |
| 5,592,491 | A | 1/1997 | Dinkins |
| 5,594,425 | A | 1/1997 | Ladner et al. |
| 5,594,740 | A | 1/1997 | LaDue |
| 5,594,953 | A | 1/1997 | Ross et al. |
| 5,596,319 | A | 1/1997 | Spry |
| 5,600,299 | A | 2/1997 | Tompkins |

(56) References Cited

U.S. PATENT DOCUMENTS

| | | |
|---|---|---|
| 5,600,368 A | 2/1997 | Matthews, III |
| 5,602,450 A | 2/1997 | Cowan et al. |
| 5,606,361 A | 2/1997 | Davidsohn et al. |
| 5,613,055 A | 3/1997 | Shimoura et al. |
| 5,619,183 A | 4/1997 | Ziegra et al. |
| 5,625,670 A | 4/1997 | Campana, Jr. et al. |
| 5,627,529 A | 5/1997 | Duckworth et al. |
| 5,627,753 A | 5/1997 | Brankin et al. |
| 5,629,980 A | 5/1997 | Stefik et al. |
| 5,633,872 A | 5/1997 | Dinkins |
| 5,636,211 A | 6/1997 | Newlin et al. |
| 5,638,280 A * | 6/1997 | Nishimura et al. ........... 701/209 |
| 5,640,442 A | 6/1997 | Fitzgerald et al. |
| 5,648,769 A | 7/1997 | Sato et al. |
| 5,650,774 A | 7/1997 | Drori |
| 5,652,564 A | 7/1997 | Winbush |
| 5,660,246 A | 8/1997 | Kaman |
| 5,661,651 A | 8/1997 | Geschke et al. |
| 5,668,537 A | 9/1997 | Chansky et al. |
| 5,671,158 A | 9/1997 | Fournier et al. |
| 5,680,123 A | 10/1997 | Lee |
| 5,682,133 A | 10/1997 | Johnson et al. |
| 5,689,442 A | 11/1997 | Swanson et al. |
| 5,694,335 A | 12/1997 | Hollenberg |
| 5,699,276 A | 12/1997 | Roos |
| 5,708,417 A | 1/1998 | Tallman et al. |
| 5,710,970 A | 1/1998 | Walters et al. |
| 5,712,789 A | 1/1998 | Radican |
| 5,715,905 A | 2/1998 | Kaman |
| 5,717,379 A | 2/1998 | Peters |
| 5,717,392 A | 2/1998 | Eldridge |
| 5,719,771 A | 2/1998 | Buck et al. |
| 5,721,550 A | 2/1998 | Lopez |
| 5,721,829 A | 2/1998 | Dunn et al. |
| 5,724,092 A | 3/1998 | Davidsohn et al. |
| 5,724,475 A | 3/1998 | Kirsten |
| 5,727,950 A | 3/1998 | Cook et al. |
| 5,729,217 A | 3/1998 | Ito et al. |
| 5,729,452 A | 3/1998 | Smith et al. |
| 5,731,785 A | 3/1998 | Lemelson et al. |
| 5,732,074 A | 3/1998 | Spaur et al. |
| 5,734,413 A | 3/1998 | Lappington et al. |
| 5,734,963 A | 3/1998 | Fitzgerald et al. |
| 5,736,927 A | 4/1998 | Stebbins et al. |
| 5,737,222 A | 4/1998 | Palmer |
| 5,742,924 A | 4/1998 | Nakayama |
| 5,745,161 A | 4/1998 | Ito |
| 5,751,245 A | 5/1998 | Janky et al. |
| 5,752,217 A * | 5/1998 | Ishizaki et al. ................ 701/201 |
| 5,754,430 A | 5/1998 | Sawada |
| 5,756,934 A | 5/1998 | Purdom |
| 5,757,640 A | 5/1998 | Monson |
| 5,758,300 A | 5/1998 | Abe |
| 5,758,313 A | 5/1998 | Shah et al. |
| 5,760,742 A | 6/1998 | Branch et al. |
| 5,761,625 A | 6/1998 | Honcik et al. |
| 5,765,152 A | 6/1998 | Erickson |
| 5,769,643 A | 6/1998 | Stevens, III |
| 5,772,446 A | 6/1998 | Rosen |
| 5,774,064 A | 6/1998 | Lambropoulos et al. |
| 5,774,876 A | 6/1998 | Woolley et al. |
| 5,786,746 A | 7/1998 | Lombardo et al. |
| 5,788,508 A | 8/1998 | Lee et al. |
| 5,790,019 A | 8/1998 | Edwin |
| 5,791,441 A | 8/1998 | Matos et al. |
| 5,793,300 A | 8/1998 | Suman et al. |
| 5,793,980 A | 8/1998 | Glaser et al. |
| 5,796,365 A | 8/1998 | Lewis |
| 5,796,612 A | 8/1998 | Palmer |
| 5,796,728 A | 8/1998 | Rondeau et al. |
| 5,798,647 A | 8/1998 | Martin et al. |
| 5,801,618 A | 9/1998 | Jenkins |
| 5,801,943 A * | 9/1998 | Nasburg ........................ 701/117 |
| 5,802,454 A | 9/1998 | Goshay et al. |
| 5,802,492 A | 9/1998 | DeLorme et al. |
| 5,809,161 A | 9/1998 | Auty et al. |
| 5,811,886 A | 9/1998 | Majmudar |
| 5,812,931 A | 9/1998 | Yuen |
| 5,812,959 A | 9/1998 | Froeburg et al. |
| 5,815,093 A | 9/1998 | Kikinis |
| 5,815,557 A | 9/1998 | Larson |
| 5,816,918 A | 10/1998 | Kelly et al. |
| 5,818,439 A | 10/1998 | Nagasaka et al. |
| 5,819,172 A | 10/1998 | Campana, Jr. et al. |
| 5,819,201 A | 10/1998 | DeGraaf |
| 5,821,718 A | 10/1998 | Shaffer et al. |
| 5,821,880 A | 10/1998 | Morimoto et al. |
| 5,823,948 A | 10/1998 | Ross, Jr. et al. |
| 5,825,283 A | 10/1998 | Camhi |
| 5,826,827 A | 10/1998 | Coyaso et al. |
| 5,835,376 A | 11/1998 | Smith et al. |
| 5,835,871 A | 11/1998 | Smith et al. |
| 5,838,250 A | 11/1998 | Maekawa |
| 5,838,255 A | 11/1998 | Di Croce |
| 5,838,683 A | 11/1998 | Corley et al. |
| 5,841,638 A | 11/1998 | Purdom et al. |
| 5,842,199 A | 11/1998 | Miller et al. |
| 5,842,978 A | 12/1998 | Levy |
| 5,844,473 A | 12/1998 | Kaman |
| 5,844,601 A | 12/1998 | McPheely et al. |
| 5,845,203 A | 12/1998 | LaDue |
| 5,845,227 A | 12/1998 | Peterson |
| 5,845,240 A | 12/1998 | Fielder |
| 5,845,283 A | 12/1998 | Williams et al. |
| 5,848,373 A | 12/1998 | DeLorme et al. |
| 5,850,250 A | 12/1998 | Konopka et al. |
| 5,854,969 A | 12/1998 | Gullner |
| 5,861,799 A | 1/1999 | Szwed |
| 5,862,330 A | 1/1999 | Anupam et al. |
| 5,862,500 A | 1/1999 | Goodwin |
| 5,862,511 A | 1/1999 | Croyle et al. |
| 5,867,208 A | 2/1999 | McLaren |
| 5,867,821 A | 2/1999 | Ballantyne et al. |
| 5,877,707 A | 3/1999 | Kowalick |
| 5,878,368 A | 3/1999 | DeGraaf |
| 5,880,720 A | 3/1999 | Iwafune et al. |
| 5,884,032 A | 3/1999 | Bateman et al. |
| 5,884,202 A | 3/1999 | Arjomand |
| 5,890,079 A | 3/1999 | Levine |
| 5,892,437 A | 4/1999 | Scheibe et al. |
| 5,895,440 A | 4/1999 | Proctor et al. |
| 5,896,020 A | 4/1999 | Pyo |
| 5,897,602 A | 4/1999 | Mizuta |
| 5,897,623 A | 4/1999 | Fein et al. |
| 5,898,392 A | 4/1999 | Bambini et al. |
| 5,899,956 A | 5/1999 | Chan |
| 5,900,905 A | 5/1999 | Shoff et al. |
| 5,903,226 A | 5/1999 | Suman et al. |
| 5,903,816 A | 5/1999 | Broadwin et al. |
| 5,908,465 A | 6/1999 | Ito et al. |
| 5,910,882 A | 6/1999 | Burrell |
| 5,911,582 A | 6/1999 | Redford et al. |
| 5,911,776 A | 6/1999 | Guck |
| 5,913,917 A | 6/1999 | Murphy |
| 5,914,685 A | 6/1999 | Kozlov et al. |
| 5,917,405 A | 6/1999 | Joao |
| 5,917,406 A | 6/1999 | Postel |
| 5,917,434 A | 6/1999 | Murphy |
| 5,919,244 A | 7/1999 | Danz et al. |
| 5,922,037 A | 7/1999 | Potts |
| 5,922,041 A | 7/1999 | Anderson |
| 5,925,103 A | 7/1999 | Magallanes et al. |
| 5,929,850 A | 7/1999 | Broadwin et al. |
| 5,931,878 A | 8/1999 | Chapin, Jr. |
| 5,936,553 A | 8/1999 | Kabel |
| 5,938,721 A | 8/1999 | Dussell et al. |
| 5,944,768 A | 8/1999 | Ito et al. |
| 5,945,919 A | 8/1999 | Trask |
| 5,948,026 A | 9/1999 | Beemer, II. et al. |
| 5,948,040 A | 9/1999 | DeLorme et al. |
| 5,949,345 A | 9/1999 | Beckert et al. |
| 5,950,543 A | 9/1999 | Oster |
| 5,957,995 A | 9/1999 | Beckmann et al. |
| 5,959,568 A | 9/1999 | Woolley |

(56) References Cited

U.S. PATENT DOCUMENTS

| | | |
|---|---|---|
| 5,959,577 A | 9/1999 | Fan et al. |
| 5,960,337 A | 9/1999 | Brewster et al. |
| 5,961,571 A | 10/1999 | Gorr et al. |
| 5,963,202 A | 10/1999 | Polish |
| 5,969,595 A | 10/1999 | Schipper et al. |
| 5,969,714 A | 10/1999 | Butcher |
| 5,969,953 A | 10/1999 | Purdom et al. |
| 5,973,619 A | 10/1999 | Paredes |
| 5,974,349 A | 10/1999 | Levine |
| 5,974,446 A | 10/1999 | Sonnenreich et al. |
| 5,976,567 A | 11/1999 | Wheeler et al. |
| 5,976,648 A | 11/1999 | Li et al. |
| 5,978,567 A | 11/1999 | Rebane et al. |
| 5,978,648 A | 11/1999 | George et al. |
| 5,978,799 A | 11/1999 | Hirsch |
| 5,982,048 A | 11/1999 | Fendt et al. |
| 5,982,418 A | 11/1999 | Ely |
| 5,983,161 A | 11/1999 | Lemelson et al. |
| 5,988,645 A | 11/1999 | Downing |
| 5,991,690 A | 11/1999 | Murphy |
| 5,991,692 A | 11/1999 | Spencer, II et al. |
| 5,995,705 A | 11/1999 | Lang |
| 5,999,808 A | 12/1999 | LaDue |
| 6,001,065 A | 12/1999 | DeVito |
| 6,001,066 A | 12/1999 | Canfield et al. |
| 6,002,326 A | 12/1999 | Turner |
| 6,002,720 A | 12/1999 | Yurt et al. |
| 6,002,972 A | 12/1999 | Palmer |
| 6,003,007 A | 12/1999 | DiRienzo |
| 6,006,159 A | 12/1999 | Schmier et al. |
| 6,007,095 A | 12/1999 | Stanley |
| 6,007,426 A | 12/1999 | Kelly et al. |
| 6,009,355 A | 12/1999 | Obradovich et al. |
| 6,009,356 A | 12/1999 | Monroe |
| 6,009,363 A | 12/1999 | Beckert et al. |
| 6,009,370 A | 12/1999 | Minowa et al. |
| 6,014,447 A | 1/2000 | Kohnen et al. |
| 6,014,569 A | 1/2000 | Bottum |
| 6,016,475 A | 1/2000 | Miller et al. |
| 6,018,710 A | 1/2000 | Wynblatt et al. |
| 6,020,825 A | 2/2000 | Chansky et al. |
| 6,020,826 A | 2/2000 | Rein |
| 6,021,371 A | 2/2000 | Fultz |
| 6,023,708 A | 2/2000 | Mendez et al. |
| 6,028,505 A | 2/2000 | Drori |
| 6,028,537 A | 2/2000 | Suman et al. |
| 6,028,550 A | 2/2000 | Froeberg et al. |
| 6,029,111 A | 2/2000 | Croyle |
| 6,037,942 A | 3/2000 | Millington |
| 6,037,977 A | 3/2000 | Peterson |
| 6,038,509 A | 3/2000 | Poppen et al. |
| 6,044,990 A | 4/2000 | Palmeri |
| 6,046,678 A | 4/2000 | Wilk |
| 6,047,264 A | 4/2000 | Fisher et al. |
| 6,049,711 A | 4/2000 | Ben-Yehezkel et al. |
| 6,049,755 A | 4/2000 | Lou et al. |
| 6,052,646 A | 4/2000 | Kirkhart et al. |
| 6,055,314 A | 4/2000 | Spies et al. |
| 6,055,479 A | 4/2000 | Kirkhart et al. |
| 6,058,339 A | 5/2000 | Takiguchi et al. |
| 6,059,843 A | 5/2000 | Kirkhart |
| 6,061,570 A | 5/2000 | Janow |
| 6,064,322 A | 5/2000 | Ohira |
| 6,064,335 A | 5/2000 | Eschenbach |
| 6,067,451 A | 5/2000 | Campana, Jr. et al. |
| 6,067,571 A | 5/2000 | Igarashi et al. |
| 6,070,932 A | 6/2000 | Lopez-Baquero et al. |
| 6,072,402 A | 6/2000 | Kniffin et al. |
| 6,073,106 A | 6/2000 | Rozen et al. |
| 6,075,527 A | 6/2000 | Ichihashi et al. |
| 6,076,039 A | 6/2000 | Kabel et al. |
| 6,076,066 A | 6/2000 | DiRienzo et al. |
| 6,078,800 A | 6/2000 | Kasser |
| 6,078,864 A | 6/2000 | Long et al. |
| 6,084,510 A | 7/2000 | Lemelson et al. |
| 6,091,956 A * | 7/2000 | Hollenberg .................. 455/456 |
| 6,102,487 A | 8/2000 | .O slashed.vreb.o slashed. |
| 6,104,815 A | 8/2000 | Alcorn et al. |
| 6,108,493 A | 8/2000 | Miller et al. |
| 6,108,591 A | 8/2000 | Segal et al. |
| 6,108,603 A | 8/2000 | Karunanidhi |
| 6,112,141 A | 8/2000 | Briffe et al. |
| 6,113,493 A | 9/2000 | Walker et al. |
| 6,124,825 A | 9/2000 | Eschenbach |
| 6,131,060 A | 10/2000 | Obradovich et al. |
| 6,131,096 A | 10/2000 | Ng et al. |
| 6,131,116 A | 10/2000 | Riggins et al. |
| 6,137,485 A | 10/2000 | Kawai et al. |
| 6,138,241 A | 10/2000 | Eckel et al. |
| 6,141,608 A | 10/2000 | Rother |
| 6,141,620 A | 10/2000 | Zyburt et al. |
| 6,141,621 A | 10/2000 | Piwowarski et al. |
| 6,144,318 A | 11/2000 | Hayashi et al. |
| 6,144,702 A | 11/2000 | Yurt et al. |
| 6,148,081 A | 11/2000 | Szymanski et al. |
| 6,148,291 A | 11/2000 | Radican |
| 6,151,539 A | 11/2000 | Bergholz et al. |
| 6,151,606 A | 11/2000 | Mendez |
| 6,151,626 A | 11/2000 | Tims et al. |
| 6,161,005 A | 12/2000 | Pinzon |
| 6,163,269 A | 12/2000 | Millington et al. |
| 6,163,753 A | 12/2000 | Beckmann et al. |
| 6,167,432 A | 12/2000 | Jiang |
| 6,169,955 B1 | 1/2001 | Fultz |
| 6,172,641 B1 | 1/2001 | Millington |
| 6,173,232 B1 | 1/2001 | Nanba et al. |
| 6,178,380 B1 | 1/2001 | Millington |
| 6,181,994 B1 | 1/2001 | Colson et al. |
| 6,188,325 B1 | 2/2001 | Vogel |
| 6,188,956 B1 | 2/2001 | Walters |
| 6,191,825 B1 | 2/2001 | Sprogis et al. |
| 6,192,314 B1 | 2/2001 | Khavakh et al. |
| 6,202,026 B1 | 3/2001 | Nimura et al. |
| 6,208,379 B1 | 3/2001 | Oya et al. |
| 6,208,386 B1 | 3/2001 | Wilf et al. |
| 6,208,973 B1 | 3/2001 | Boyer et al. |
| 6,211,798 B1 | 4/2001 | Albrecht et al. |
| 6,216,104 B1 | 4/2001 | Moshfeghi et al. |
| 6,222,583 B1 | 4/2001 | Matsumura et al. |
| 6,226,389 B1 | 5/2001 | Lemelson et al. |
| 6,229,479 B1 | 5/2001 | Kozlov et al. |
| 6,233,341 B1 | 5/2001 | Riggins |
| 6,233,506 B1 | 5/2001 | Obradovich et al. |
| 6,233,517 B1 | 5/2001 | Froeberg |
| 6,236,330 B1 | 5/2001 | Cohen |
| 6,243,691 B1 | 6/2001 | Fisher et al. |
| 6,244,758 B1 | 6/2001 | Solymar et al. |
| 6,249,241 B1 * | 6/2001 | Jordan et al. .................. 342/41 |
| 6,252,522 B1 | 6/2001 | Hampton et al. |
| 6,256,029 B1 | 7/2001 | Millington |
| 6,263,322 B1 | 7/2001 | Kirkevold et al. |
| 6,266,612 B1 | 7/2001 | Dussell et al. |
| 6,269,392 B1 | 7/2001 | Cotichini et al. |
| 6,273,856 B1 | 8/2001 | Sun et al. |
| 6,275,231 B1 | 8/2001 | Obradovich |
| 6,278,396 B1 | 8/2001 | Tran |
| 6,281,797 B1 | 8/2001 | Forster et al. |
| 6,282,490 B1 | 8/2001 | Nimura et al. |
| 6,282,495 B1 | 8/2001 | Kirkhart et al. |
| 6,283,761 B1 | 9/2001 | Joao |
| 6,292,227 B1 | 9/2001 | Wilf et al. |
| 6,292,828 B1 | 9/2001 | Williams |
| 6,295,492 B1 | 9/2001 | Lang et al. |
| 6,296,544 B1 | 10/2001 | Hochfeld |
| 6,297,853 B1 | 10/2001 | Sharir et al. |
| 6,298,303 B1 | 10/2001 | Khavakh et al. |
| 6,307,948 B1 | 10/2001 | Kawasaki et al. |
| 6,308,134 B1 | 10/2001 | Croyle et al. |
| 6,317,592 B1 | 11/2001 | Campana, Jr. et al. |
| 6,318,536 B1 | 11/2001 | Korman et al. |
| 6,321,158 B1 | 11/2001 | DeLorme et al. |
| 6,321,221 B1 | 11/2001 | Bieganski |
| 6,323,566 B1 | 11/2001 | Meier |
| 6,329,946 B1 | 12/2001 | Hirata et al. |

(56) References Cited

U.S. PATENT DOCUMENTS

| | | | |
|---|---|---|---|
| 6,330,149 B1 | 12/2001 | Burrell |
| 6,330,482 B1 | 12/2001 | McCain et al. |
| 6,330,499 B1 | 12/2001 | Chou et al. |
| 6,331,825 B1 | 12/2001 | Ladner et al. |
| 6,332,098 B2 | 12/2001 | Ross et al. |
| 6,334,127 B1 | 12/2001 | Bieganski et al. |
| 6,341,265 B1 | 1/2002 | Provost et al. |
| 6,341,668 B1 | 1/2002 | Fayette et al. |
| 6,347,333 B2 | 2/2002 | Eisendrath et al. |
| 6,356,822 B1 | 3/2002 | Diaz et al. |
| 6,356,835 B2 | 3/2002 | Hayashi et al. |
| 6,359,571 B1 | 3/2002 | Endo et al. |
| 6,360,167 B1 | 3/2002 | Millington et al. |
| 6,362,730 B2 | 3/2002 | Razavi et al. |
| 6,362,751 B1 | 3/2002 | Upparapalli |
| 6,363,322 B1 | 3/2002 | Millington |
| 6,366,240 B1 | 4/2002 | Timothy et al. |
| 6,374,228 B1 | 4/2002 | Litwin |
| 6,381,583 B1 | 4/2002 | Kenney |
| 6,385,732 B1 | 5/2002 | Eckel et al. |
| 6,388,399 B1 | 5/2002 | Eckel et al. |
| 6,389,337 B1 | 5/2002 | Kolls |
| 6,400,996 B1 | 6/2002 | Hoffberg et al. |
| 6,401,027 B1 | 6/2002 | Xu et al. |
| 6,405,130 B1 | 6/2002 | Piwowarski |
| 6,408,278 B1 | 6/2002 | Carney et al. |
| 6,411,502 B1 | 6/2002 | Burrell |
| 6,411,899 B2 | 6/2002 | Dussell et al. |
| 6,412,012 B1 | 6/2002 | Bieganski et al. |
| 6,424,998 B2 | 7/2002 | Hunter |
| 6,427,063 B1 | 7/2002 | Cook et al. |
| 6,429,810 B1 | 8/2002 | De Roche |
| 6,430,531 B1 | 8/2002 | Polish |
| 6,430,603 B2 | 8/2002 | Hunter |
| 6,430,605 B2 | 8/2002 | Hunter |
| 6,431,985 B1 | 8/2002 | Kim |
| 6,437,692 B1 | 8/2002 | Petite et al. |
| 6,448,908 B1 | 9/2002 | Hijikata |
| 6,464,142 B1 | 10/2002 | Denenberg et al. |
| 6,466,865 B1 | 10/2002 | Petzold |
| 6,474,927 B1 | 11/2002 | McAdams et al. |
| 6,493,685 B1 | 12/2002 | Ensel et al. |
| 6,506,119 B1 | 1/2003 | Burrell et al. |
| 6,522,955 B1 | 2/2003 | Colborn |
| 6,525,780 B1 | 2/2003 | Bruno et al. |
| 6,532,419 B1 | 3/2003 | Begin et al. |
| 6,539,301 B1 | 3/2003 | Shirk et al. |
| 6,542,076 B1 | 4/2003 | Joao |
| 6,542,077 B2 | 4/2003 | Joao |
| 6,549,130 B1 | 4/2003 | Joao |
| 6,567,813 B1 | 5/2003 | Zhu et al. |
| 6,587,046 B2 | 7/2003 | Joao |
| 6,601,087 B1 | 7/2003 | Zhu et al. |
| 6,606,559 B1 | 8/2003 | Beckmann et al. |
| 6,608,559 B1 | 8/2003 | Lemelson et al. |
| 6,610,954 B2 | 8/2003 | Takizawa |
| 6,611,753 B1 | 8/2003 | Millington |
| 6,615,186 B1 | 9/2003 | Kolls |
| 6,621,827 B1 | 9/2003 | Rezvani et al. |
| 6,646,655 B1 | 11/2003 | Brandt et al. |
| 6,654,032 B1 | 11/2003 | Zhu et al. |
| 6,686,838 B1 | 2/2004 | Rezvani et al. |
| 6,691,154 B1 | 2/2004 | Zhu et al. |
| 6,707,484 B1 | 3/2004 | Kawasaki et al. |
| 6,708,221 B1 | 3/2004 | Mendez et al. |
| 6,725,460 B1 | 4/2004 | Nishiyama et al. |
| 6,726,094 B1 | 4/2004 | Rantze et al. |
| 6,732,077 B1 | 5/2004 | Gilbert et al. |
| 6,745,027 B2 | 6/2004 | Twitchell, Jr. |
| 6,763,501 B1 | 7/2004 | Zhu et al. |
| 6,765,554 B2 | 7/2004 | Millington |
| 6,766,454 B1 | 7/2004 | Riggins |
| 6,789,119 B1 | 9/2004 | Zhu et al. |
| RE38,609 E | 10/2004 | Chen et al. |
| 6,804,656 B1 | 10/2004 | Rosenfeld et al. |
| 6,810,488 B2 | 10/2004 | Teng |
| 6,816,616 B2 | 11/2004 | Teng |
| 6,816,817 B1 | 11/2004 | Retlich et al. |
| 6,850,497 B1 | 2/2005 | Sigler et al. |
| 6,850,965 B2 | 2/2005 | Allen |
| 6,859,722 B2 | 2/2005 | Jones |
| 6,873,907 B1 | 3/2005 | Millington et al. |
| 6,882,269 B2 | 4/2005 | Moreno |
| 6,889,135 B2 | 5/2005 | Curatolo et al. |
| 6,901,439 B1 | 5/2005 | Bonasia et al. |
| 6,901,448 B2 | 5/2005 | Zhu et al. |
| 6,924,727 B2 | 8/2005 | Nagaoka et al. |
| 6,925,645 B2 | 8/2005 | Zhu et al. |
| 6,927,686 B2 | 8/2005 | Nieters et al. |
| 6,930,455 B2 | 8/2005 | Chansky et al. |
| 6,943,681 B2 | 9/2005 | Rezvani et al. |
| 6,976,916 B2 | 12/2005 | Burrell et al. |
| 7,075,459 B1 | 7/2006 | Begin et al. |
| 7,164,117 B2 | 1/2007 | Breed et al. |
| 7,212,829 B1 | 5/2007 | Lau et al. |
| 7,272,179 B2 | 9/2007 | Siemens et al. |
| 7,277,010 B2 | 10/2007 | Joao |
| 7,313,476 B2 | 12/2007 | Nichols et al. |
| 7,397,363 B2 | 7/2008 | Joao |
| 5,388,101 C1 | 1/2012 | Dinkins |
| 6,055,314 C1 | 4/2012 | Spies et al. |
| 5,388,101 C2 | 8/2012 | Dinkins |
| 2001/0032099 A1 | 10/2001 | Joao |
| 2002/0016655 A1 | 2/2002 | Joao |
| 2002/0017996 A1 | 2/2002 | Niemiec |
| 2002/0032583 A1 | 3/2002 | Joao |
| 2002/0046299 A1 | 4/2002 | Lefeber et al. |
| 2002/0049622 A1 | 4/2002 | Lettich et al. |
| 2002/0049822 A1 | 4/2002 | Burkhardt et al. |
| 2002/0072808 A1 | 6/2002 | Li |
| 2002/0077077 A1 | 6/2002 | Rezvani et al. |
| 2002/0099567 A1 | 7/2002 | Joao |
| 2002/0108125 A1 | 8/2002 | Joao |
| 2002/0116318 A1 | 8/2002 | Thomas et al. |
| 2002/0121969 A1 | 9/2002 | Joao |
| 2002/0198774 A1 | 12/2002 | Weirich |
| 2003/0009361 A1 | 1/2003 | Hancock et al. |
| 2003/0014295 A1 | 1/2003 | Brookes et al. |
| 2003/0016130 A1 | 1/2003 | Joao |
| 2003/0067541 A1 | 4/2003 | Joao |
| 2003/0071899 A1 | 4/2003 | Joao |
| 2003/0084125 A1 | 5/2003 | Nagda et al. |
| 2003/0110215 A1 | 6/2003 | Joao |
| 2003/0140107 A1 | 7/2003 | Rezvani et al. |
| 2003/0193404 A1 | 10/2003 | Joao |
| 2003/0224854 A1 | 12/2003 | Joao |
| 2004/0098515 A1 | 5/2004 | Rezvani et al. |
| 2004/0160319 A1 | 8/2004 | Joao |
| 2004/0230601 A1 | 11/2004 | Joao et al. |
| 2005/0040937 A1 | 2/2005 | Cuddihy et al. |
| 2005/0248444 A1 | 11/2005 | Joao |

FOREIGN PATENT DOCUMENTS

| | | |
|---|---|---|
| EP | 80304009 | 11/1980 |
| EP | 0028933 | 5/1981 |
| EP | 028933 A2 | 5/1981 |
| EP | 80304009 | 5/1981 |
| EP | 87302967 | 4/1987 |
| EP | 0229869 | 7/1987 |
| EP | 0229869 B1 | 7/1987 |
| EP | 0232031 A1 | 8/1987 |
| EP | 0 242 099 A2 | 10/1987 |
| EP | 0242099 | 10/1987 |
| EP | 0242099 A2 | 10/1987 |
| EP | 0242099 A3 | 10/1987 |
| EP | 0395596 | 10/1990 |
| EP | 0413090 | 2/1991 |
| EP | 91202938 | 11/1991 |
| EP | 9102289 | 12/1991 |
| EP | 0494030 | 7/1992 |
| EP | 0494030 A1 | 8/1992 |
| EP | 050627 A3 | 9/1992 |
| EP | 0505266 | 9/1992 |

(56) References Cited

FOREIGN PATENT DOCUMENTS

| | | |
|---|---|---|
| EP | 0505266 A1 | 9/1992 |
| EP | 0505627 | 9/1992 |
| EP | 0505627 A2 | 9/1992 |
| EP | 0680859 | 4/1994 |
| EP | 0604009 | 6/1994 |
| EP | 0606627 | 7/1994 |
| EP | 0606627 A1 | 7/1994 |
| EP | 0720412 A2 | 12/1994 |
| EP | 0720412 | 11/1995 |
| EP | 0704712 | 3/1996 |
| EP | 952588 | 4/1998 |
| EP | 99107994 | 10/1999 |
| FR | 2 674 352 A1 | 9/1992 |
| FR | 2674352 | 9/1992 |
| FR | 2674352 A1 | 9/1992 |
| FR | 2816434 | 5/2002 |
| GB | 2051442 | 1/1981 |
| GB | 89/00673 | 6/1989 |
| GB | 2217081 | 10/1989 |
| GB | 2253534 A | 9/1992 |
| GB | 2253534 A | 9/1992 |
| GB | 2279478 | 1/1995 |
| GB | 2263376 | 7/1999 |
| JP | 63-34612 | 2/1988 |
| JP | 04-268860 A | 9/1992 |
| JP | 1993120108 A | 12/1994 |
| SE | 9200631 | 9/1993 |
| WO | WO89/05553 | 6/1989 |
| WO | WO 89/05553 | 6/1989 |
| WO | WO 89/12835 | 12/1989 |
| WO | WO 92/22883 | 12/1992 |
| WO | WO92/22883 | 12/1992 |
| WO | WO 96/02106 | 1/1996 |
| WO | WO96/02106 | 1/1996 |

OTHER PUBLICATIONS

Stafford-Fraser, Quentin, "The Trojan Room Coffee Pot—A (non-technical) biography", First published May 1995, http://www.cl.cam.ac.uk/coffee/qsf/coffee.html.

Stafford-Fraser, Quentin "The Life and Times of the First Web Cam—When convenience was the mother of invention", Communications of the ACM, Jul. 2001, vol. 44, No. 7, pp. 25-26, http://www.cl.cam.ac.uk/coffee/qsf/cacm200107.html.

Stafford-Fraser, Quentin, "The Story of the Trojan Room Coffee Pot—A Timeline", Aug. 22, 2001, http://www.cl.cam.ac.uk/coffee/qsf/timeline.html.

Sattler, Michael 'Mickey', Internet TV with CU-SeeMe: Chapter 8—History, Culture, and Usage, copyrighted 1993-2003, http://www.geektimes.com/michael/CU-SeeMe/internetTVwithCUSeeMe/chapter08/culture.html.

CU-SeeMe Development Team, CU-SeeMe Welcome page, Last pass: Nov. 11, 1996, http://web,archive,org./web/19970418025505/cu-seeme.cornell.edu/Welcome.html.

Cox, Brad, "Global Schoolhouse Project", Virtual school, Copyright 2004, Modification date: Jan. 22, 2004, http://www.virtualschool.edu/mon/Academia/GlobalSchoolhouseProject.html.

Dorcey, Tim, "CU-SeeMe Desktop VideoConferencing Software", From Connexions, vol. 9, No. 3, Mar. 1995, http://web.archive.org/web/19970418025546/cu-seeme.cornell.edu/DorceyConnexions.html.

Savetz, Kevin, et al., MBONE: Multicasting Tomorrow's Internet, Table of Contents, IDG, Apr. 1996, Copyright 1996, 1998, http://www.savetz.com/mbone/toc.html.

Savetz, Kevin, et al., MBONE: Multicasting Tomorrow's Internet, Chapter 2: Today's Technology, IDG, Apr. 1996, Copyright 1996, 1998, http://www.savetz.com/mbone/ch2.html.

Savetz, Kevin, et al., MBONE: Multicasting Tomorrow's Internet, Chapter 3: The MBONE and Multicasting, IDG, Apr. 1996, Copyright 1996, 1998, http://www.savetz.com/mbone/ch.3html.

Hesseldahl, "TomTom on the Go-Go", BusinessWeek, Aug. 28, 2006.

Dorcey, "CU-SeeMe Desktop VideoConferencing Software", From Connexions, Mar. 1995, vol. 9, No. 3.

Ellis, Sun, Starlight Nets team up on bussiness video servers. (Sun Microsystems Inc.; Starlight Networks Inc.), Multichannel News, Oct. 10, 1994.

National Communications System, "Transporting Video Teleconferencing Traffic", Technical Information Bulletin 93-13, Dec. 1993, National Communications System, Arlington, VA.

Sattler, "Internet TV with CU-SeeMe", 1995, Sams.net Publishing, Indianapolis, IN.

"West Georgia Resa Chooses the Network Connection's Cheetah Video on Demand Server for Classroom of the Future", PR Newswire Association, May 15, 1995, pp. 1-2, http://www.highbeam.com/DocPrint.aspx?DocId=1G1:1694896.

"Code-Alarm debuts first stolen vehicle recovery system to use both cellular, Loran technologies", Nov. 28, 1989, pp. 1-2, PR Newswire Association LLC, http://www.highbeam.com/DocPrint.aspx?DocId=11:7916220.

Stauffer, H. Brooke, "Smart Enabling System for Home Automation", IEEE Transactions on Consumer Electronics, May 1991, pp. xxix-xxxv, vol. 37, No. 2, IEEE.

Kojima, et al., "Visual Communication System in an Apartment House Using Fiber Optics," IEEE Transactions on Consumer Electronics, Aug. 1993, pp. 653-659, vol. 39, No. 3,IEEE.

Noore, et al., "Computer-Based Multimedia Video Conferencing System"IEEE Transactions on Consumer Electronics, Aug. 1993, pp. 587-592, vol. 39, No. 3, IEEE.

Bohus, et al., "Running Control Engineering Experiments Over the Internet," Aug. 1995, pp. 1-13, Dept. Computer Science, Oregon State University, USA.

Drummond, M. et al., "Flexible Scheduling of Automatic Telescopes over the Internet", Robotic Telescopes ASP Conference Series, 1995, pp. 101-119, vol. 79, Astronomical Society of the Pacific.

Unknown, "CU-SeeMe", Aug. 2007, http://timeline.1904.cc/tiki-index.php?page=CU-SeeMe.

Cogger, Richard, et al., "The CU-SeeMe Project", Mar. 26, 2012, pp. 1-8, CU-SeeMe Development Team, http://ipsixorg/source/cuseeme_project.html.

Scorer, Tony, "Trakbak Vehicle Location and Recovery", 1993, pp. 1-4, The Institution of Electrical Engineers, London, UK.

Lin, Tzung-Pao, "Migration of Home Information Systems Toward ISDN", IEEE Transaction on Consumer Electronics, May 1990, pp. 103-109, vol. 36, No. 2, IEEE.

Stauffer, H. Brooke, "Smart Enabling System for Home Automation", IEEE Transactions on Consumer Electronics, May 1991, pp. xxix-xxxv, vol. 37, No. 2. IEEE.

Inoue, et al., "A Home Automation System", IEEE Transactions on Consumer Electronics, Aug. 1985, pp. 516-527, vol. CE-31, No. 3, IEEE.

Graves, Sean, er al. "A Modular Software System for Distributed Telerobotics", Unknown, Aug. 25, 1994, pp. 1-12.

Macedonia, Michael R. et al., "MBone Provides Audio and Video Across the Internet", Apr. 1994, pp. 1-12.

Unknown, "Potential Pac Tel Subsidiary Launches Vehicle Location Services", BOC Week, Dec. 10, 1990, p. 9, vol.7 No. 48, Capitol Publications, Inc. ISSN: 8755-3511.

Unknown, "Multitude of Car Audio Innovatons at CES" Audio Week, Jan. 27, 1992, p. N/A, vol.4, No. 4, Warren Publishing, Inc., ISSN: 1044-7601.

Bai, Weiqiang, et al., "Design, Implementation and Analysis of a Multimedia Conference System Using TCP/UDP", 1994, pp. 1749-1753, IEEE.

De Moraes, Luis F. M., et al., "The Internet Multicast from ITS: How it was Done and Implicatons for the Future," IEEE Communications Magazine. Jan. 1995, pp. 6-8, IEEE.

Moezzi, Saied, et al., "An Emerging Medium: Interactive Three-Dimensional Digital Video," IEEE Proceedings of Multimedia '96, 1996, pp. 358-361, IEEE.

Abdel-Wahab, Hussein, "Reliable Information Sercive for Internet Computer Conferencing" 1993, pp. 128-142, IEEE.

Goldberg, Ken, et al., "Desktop Teleoperation via the World Wide Web", IEEE International Conference on Robotics and Automation, 1995, pp. 654-659, IEEE.

(56) References Cited

OTHER PUBLICATIONS

Chang, Edmond Chin-Ping, "Internet Based Remote Camera Control System," Jun. 22, 1996, pp. 1-4, IEEE.
Bolot, Jean-Chrysostome, et al., "A Rate Control Mechanism for Packet Video in the Internet," 1994, pp. 1216-1223, IEEE.
Goldberg, Ken, et al., "Beyond the Web: manipulating the real world", Computer Networks and ISDN Systems 28, 1995, pp. 209-219, Elsevier Science B.V.
Unknown, "Video over ISDN", Security industry news and information, Nov. 20, 1999, pp. 1-2, http://www.info4security.com/story.asp?storyCode=18449&sectioncode=9.
Khangura, K S, et al., "Vehicle Anti-Theft System Uses Radio Frequency Identification", 1993, pp. 1-7, IEE, London, UK.
Watanabe, Kenzi, et al., "Classroom Lessons of Astronomy Using The Internet and It's Multimedia Applications", 1996, pp. 389-394, IEEE.
Vetter, Ronald J., "Videoconferencing on the Internet", Computer, Jan. 1995, pp. 77-79, IEEE.
Vetter, Ronald J., "Computer-controlled devices reach the Internet", Computer, Dec. 1995, pp. 66-67, IEEE.
Turletti, Thierry, et al., "Videoconferencing on the Internet", IEEE/ACM Transactions on Networking, Jun. 1996, pp. 340-351, vol.4, No. 3, IEEE.
Soman, Sadhna, et al., "An Experimental study of Video Conferencing over the Internet", 1994, pp. 720-724, IEEE.
De Moraes, Luis F.M., et al., "The Internet Multicast from ITS: How it was Done and Implications for the Future", IEEE Communications Magazine, Jan. 1995, pp. 6-8, IEEE.
Gleick, James, "Fast Forward;Really Remote Control", The New York Times, Dec. 3, 1995, http://www.nytimes.com/1995/12/03/magazine/fast-forward-really-remot...
Chang, Edmond Chin-Ping, "Internet Based Remote Camera Control System", Jun. 22, 1996, pp. 1-4, IEEE.
Vajente-Seguin, B., et al, "Telemonitoring and Centralized Network Management on Optical Fibres for the RN 90 Olympic Winter Games Highway", The Ninth Annual European Flbre Optic Communications and Local Area Network Conference, Jun. 21, 1991, pp. 231-236 (and front cover page), IGI Europe, EFOC/LAN 91, London,UK.
Unknown, "Rover (space exploration)"date unknown, pp. 1-7, Wikipedia, http://en.wikipedia,org/wiki/Rover_%28space_exploration%29.
Unknown, "News & Features", Voyager the Interstellar Mission, date unknown, pp. 1-2, NASA, voyager.jpl.nasa.gov/index.html.
Unknown, "Fast Facts", Voyager the Interstellar Mission, date unknown, pp. 1-2, NASA, voyager.jpl.nasa.gov/missions/fastfacts.html.
Unknown, "About the Deep Space Network", Deep Space Network Home Page, date unknown, pp. 1-2, NASA, deepspace.jpl.nasa.gov/dsn/.
Cogger, Dick, "CU-SeeMe Readme file," Jan. 16, 1995, pp. 1-15, Cornell University, ftp://ftp.pl.pgp.net/pub/garbo/mac/.tcp/old/video/cuseeme-080-readme.txt.
Unknown, "Internet Teleconferencing", Using CU-See-Me for Internet Videoconferencing, date unknown, pp. 1-5, Michigan State University College of Education and Ameritech, commtechlab.msu.edu/sites/letsnet/noframes/bigideas/b9/b9u3l2.html.
Shaltanis, Dan A., "Defense Meteorological Satellite Program History", DMSP Historical Info, date unknown, pp. 1-11, www.zianet.com/tangoz/fourgrnd/History2.html.
Unknown, "CU-SeeMe Welcome Page", Cornell Information Technologies, date unknown, pp. 1-5, http://web.archive.org/web/19980502173008/http://cu-seeme.cornell.edu/Welcome.html.
Goldberg, Ken et al., "Desktop Teleoperation via the World Wide Web", IEEE International Conference on Robotics and Automation, 2995, pp. 654-659, IEEE.
Paulos, Eric, et al., "Delivering Real Reality to the World Wide Web via Telerobotics", Proceedings of the 1996 IEEE International Conference on Robotics and Automation Minneapolis, Minnesota—Apr. 1996, pp. 1694-1699, IEEE Goldberg, Ken et al., "Destop Teleoperation via the World Wide Web", IEEE International Conference on Robotics and Automation, 1995, pp. 654-659, IEEE.
Yamamoto, et al., "A Home Terminal System Using the Home Area Information Network", IEEE Transactions on Consumer Electronics, Nov. 1984, pp. 608-616, vol. CE-30, No.4, IEEE.
Fellers, Jack W., et al., "Using the Internet to Provide Suppport for Distributed Interactions",Proceedings of the 28th Annual Hawaii International Conference on System Sciences, 1995, pp. 52-60, IEEE.
Paulos, Eric, et al., "Delivering Real Reality to the World Wide Web via Telerobotics", Proceedings of the 1996 IEEE International Conference on Robotics and Automation Minneapolis, Minnesota — Apr. 1996, pp. 1694-1699, IEEE.
Ellis, Leslie, "Sun, Starlight Nets team up on business video servers. (Sun Microsystems Inc.; Starlight Networks Inc.)", Multichannel News, Oct. 10, 1994, pp. 1-2, http://www.highbeam.com/DocPrint.aspx?DocId=1G1:16340114..
Dorcey, Tim. "CU-SeeMe Desktop VideoConferencing Software", Connexions, Mar. 1995, vol. 9, No. 3, http://web.archive.org/web/19970418025546/http://cu-seeme,cornell.edu/DorceyConnexions.html..
Unknown, "Transporting Video Teleconferencing Traffic", National Communications System, Technical Information Bulletin 93-13, Dec. 1993.
Riesenbach, Ron, "Ontario Telepresence Project Final Report", Information Technology Research Centre Telecommunicatiosn Research Institute of ontario, Mar. 1, 1995.
Sattler, Mickey, "Internet TV with CU-SeeMe", http://sattlers.org/mickey/Cu-SeeMe/InternetTVwithCUSeeMe/.
Sattler, Mickey, "Internet TV with CU-SeeMe", pp. 107, 110, 117, and 123, http://sattlers.org/mickey/Cu-SeeMe/InternetTVwithCUSeeMe/.
U.S. Appl. No. 08/681,172, Polish.
U.S. Appl. No. 60/014,427, Dirienzo.
Morlock, E. K., et al., "Vehicle Monitoring and Telecommunication Systems for Enhancement of Trucking Operations," 1989, pp. 356-360, IEEE.
Cogger, Dick, "CU-SeeMe ReadME File" Jan. 16, 1995, pp. 1-14.
Eylert, "Emergency Service in the CEC Project 'Storm'" The 3rd International Conference on Vehicle Navigation & Information Systems, pp. 318-324.
Wall, Nigel, et al., "Integrated Communications Architecture for Road Transport Informatics".
Tiedermann, et al., "OmniTRACS Mobile Satellite Communications".
Cameron, et al., "Intelligent Transportation System Mayday Becomes a Reality," 1995, pp. 340-347, IEEE.
Schilling, "Wireless Communications Going Into the 21st Century," IEEE Transactions on Vehicular Technology, Aug. 1994, pp. 645-652, vol. 43 No. 3 IEEE.
Nishikawa, "Mobile Communications Integrated Operations Systems".
Lin, et al., "Heterogeneous Personal Communications Services".
Hogan, et al., "Design of a Smart, Survivable Sensor System for Enhancing the Safe and Secure Transportation of Hazardous or High-Value Cargo on Railroads".
Kitts, "A Global Spacecraft Control Network for Spacecraft Autonomy Research".
Fong, Terrence, et al., "Operator Interfaces and Network-Based Participation for Dante II," SAE Tech Paper 951518, 25th Int'l. Conf. on Environmental Sys. Jul. 10, 1995.
Davis, et al., "Combined Remote Key Control and Immobilization System for Vehicle Security," 1996, IEEE.
Gormley, Thomas J., et al., "Real Time Diagnotics for Space Shuttle Auxiliary Power System" SAE Tech Paper 951399, Sep. 7, 1995.
Jacobs, et al., "The Application of a Novel Two-Way Mobile Satellite Communications and Vehicle Tracking System to the Transportation Industry," Feb. 1991, IEEE.
Taylor, "IMDNs Revolutionize Mobile Data Communications and Vehicle Location" IEE Vehicle Nav. & Info. Sys. Conf. 1993. IEEE.

(56) References Cited

OTHER PUBLICATIONS

Sellers, et al., "An Update on the OmniTRACs Two-Way Satellite Mobile Communications System and Its Application to the Schneider National Truckload Fleet".
Salmasi, "An Overview of the OmniTRACS— The First Operational Mobile Ku-Band Satellite Communications," May 1, 1988.
Scapinakis, et al., "Communications and Positions Systems in the Motor Carrier Industry," Jan. 1, 1992.
Scapinakis, et al., "Studies of the Adoption and Use of Location and Communication Techs," Jan. 1, 1991.
Johannesen, "Fleet Management Using Inmarsat-C and GPS— A Norwegian Pilot Project" Vehicle Navigation & Information Systems, 1992, pp. 305-310, IEEE.
Rillings, et al., "TravTek".
Connectix QuickCam.
"Daily Giz Wiz 580: Connectix QuickCam," May 30, 2008.
Stauffer, "Smart Enabling System for Home Automation" IEEE Transactions on Consumer Electronics, May 1991, pp. xxix-xxxv, vol. 37, No. 2,.
Tynan, "The 50 Greatest Gadgets of the Past 50 Years," PC World, Dec. 24, 2005.
Anbinder, "Connectix is Watching, " Jul. 18, 1994.
Wheatley, "Tracker— Stolen Vehicle Recovery System," 1993, the Institution of ZElectrical Engineers, London, UK.
Scorer, Tony, Trakbak Vehicle Location and Recovery, 1993, IEE, London, UK.
Middleton, et al., "Vehicle Anti-Theft System Uses Radio Frequency Identification," 1993, IEE, London, UK.
Allen, Mike, "Beyond the Car Phone," Popular Mechanics, Aug. 1996.
"General Motors Announces OnStar," Feb. 9, 1996.
"CU-SeeMe," Wikipedia.
"The CU-SeeMe Project," Cornell Information Technologies, pp. 1-8.
CU-SeeMe Timeline.
Yamamoto, Kazuyuki, et al., "A Home Terminal System Using the Home Area Information Network," IEEE Transactions on Consumer Electronics, Nov. 1984, vol. CE-30, No. 4.
Lin, et al., "Migration of Home Information System Toward ISDN," IEEE Transactions on Consumer Electronics, May 1990, pp. 103-109, vol. 36, No. 2.
Inoue, et al., "A Home Automation System," IEEE Transactions on Consumer Electronics, Aug. 1985, pp. 516-527, vol. CE-31, No. 3.
Dorcey, "CU-SeeME Desktop VideoConferencing," Connexions, Mar. 1995.
Ellis, Leslie, "Sun, Starlight Nets Team Up on Business Video Servers," Oct. 10, 1994.
"W. Ga. Resa Chooses the Network Connection's Cheeteh Video On Demand Server for Classroom of the Future," May 15, 1995, PR Newswire.
"Code-Alarm Debuts First Stolen Vehicle Recovery Systen to Use Both Cellular, Loran Technologies," Nov. 28, 1989. PR Newswire.
"Multitude of Car Audio Innovations at CES," Audio Week, Jan. 27, 1992, vol. 4, No. 4.
"Potential Pac Tel Subsidiary Launches Vehicle Location Service," Dec. 10, 1990, p. 9, BOC Week, vol. 7, No. 48.
Henry, Gregory W., et al., "Flexible Scheduling of Automatic Telescopes Over the Internet,"Robotic Telescopes ASP Conference Series, 1995, vol. 79.
Bohus, Carisa, et al., "Running Control Engineering Experiments Over the Internet," Aug. 1995.
Bai, Weqiang, et al., "Design, Implementation and Analysis of a Multimedia Conference System Using TCP/UDP," IEEE, 1994, pp. 1749-1753.
Bolot, et al., "A Rate Control Mechanism for Packet Video in the Internet," IEEE, 1994, pp. 1216-1223.
Fellers, et al., "Using the Internet to Provide Support for Distributed Interactions," Proc. of the 28th Annual Hawaii Int'l. Conf. on Sys. Sciences, 1995, pp. 52-60.
Abdel-Wahab, "Reliable Information Service for Internet Computer Conferencing" IEEE, 1993, pp. 128-142.
Moezzi, et al., "An Emerging Medium: Interactive Three-Dimensional Digital Video" Proceedings of Multimedia '96, 1996, pp. 358-361.
Soman, et al., "An Experimental Study of Video Conferencing over the Internet" 1994, pp. 720-724, IEEE.
Turletti, et al., "Videoconferencing on the Internet," IEEE/ACM Transactions on Networking, Jun. 1996, pp. 340-351, vol. 4, No. 3.
Vetter, "Computer-controlled Devices Reach the Internet," Computer, Dec. 1995.
Vetter, "Videoconferencing on the Internet," Computer, Jan. 1995.
Graves, et al., "A Modular Software System for Distributed Telerobotics," Aug. 25, 1994.
Gleck, "Fast Forward; Really Remote Control," The New York Times, Dec. 3, 1995.
Fuhr, et al., "An Internet Observatory: Remote Monitoring of Instrumented Civil Structures Using the Information Superhighway," Smart Mater. Struct. 4, 1995, pp. 14-19.
Ballard, et al., "Automated Remote Monitoring of Structural Behavior via the Internet" SPIE, pp. 102-111.
Cordero, et al., "High Speed Network for Delivery of Education-on-Demand," SPIE, pp. 161-172.
Garcia, et al., "Monitoring Data in Real Time," Dr. Dobb's Journal, Jul. 1996, p. 56.
"Beyond Pots: Teletimer, Bell Atlantic & Honeywell Joint Development" EDGE, Apr. 6, 1992. vol. 7, No. 193.
Gillespie, et al., "Remote Observing at Apache Point," Sep. 1995.
Topol, "Business and Technology: Ground Control," Apr. 22, 2002.
Topol, "Pilot Project," Apr. 22, 2002.
Ballard, Robert D., "The Jason Remotely Operated Vehicle System," Feb. 1993.
Cao, Y. U. et al., "A Remote Robotics Laboratory on the Internet*," UCLA CS Dept. Los Angeles, CA.
Everett, H.R. et al., "Controlling Multiple Security Robots in a Warehouse Environment," Mar. 1994.
Goldberg, Ken, et al., "Beyond the Web: Excavating the Real World Via Mosaic," Second International WWW Conference, pp. 1-12.
Goldberg, Ken, et al., "Beyond the Web: Manipulating the real world," Computer Networks and ISDN Systems 28, 1995, pp.209-219, Elsevier Science B.V.
Kojima, Haruhiko, et al., "Visual Communication System in an Appartment House Using Fiber Optics," Jun. 11, 1993, IEEE.
Laird, R.T. et al., "MDARS Multiple Robot Host Architecture," Association of Unmanned Vehicle Systems, Oct. 1995.
Gerland, "Intelligence on Board— Modern Approach to Transit Fleet Management," Vehicle Navigation Information Systems Conference Proceedings, 1994.
Lin, Charles, "A New Remote-Access Tribe", PC Magazine, Feb. 6, 1996.
Wygant, Leslie, "Remote access in Digital's signle package", Apr. 25, 1995.
Mattheij, Jacques A. "Welcome to MCS," WaybackMachine, Dec. 29, 1996. http://web.archive.org/web/19961229205008/http:/mattheij.nl/.
Mattheij, Jacques A. "MCS— Interface," WaybackMachine, Jun. 24, 1998. http://web.archive.org/web/19980624042050fw/http://www.mattheij.com/interface.html.
"CU-SeeMe Welcome Page," WaybackMachine, May 2, 1998. http://web.archive.org/web/19980502173008/http://cu-seeme.cornell.edu/Welcome.html.
Melikan, Rose, "Bob Metcafe's article about the trojan Room Coffee Pot," May 15, 2013. qandr.org/quentin/coffeepot/metcalfe.
Ellwood, Stephen J. "rec.video," May 15, 2013. http://groups.google.com/group/rec.video/browse_thread/thread/c68de5ea65664440/b1e46951ddf20a93.
Caglayan, et al., "Agent Source Book— A Complete Guide to Desktop, Internet, and Intranet Agents", 1997.
Mattheij, jacques. "My Brush With a Patent Troll," Sep. 21, 2012. http://jacquesmattheij.com/my-brush-with-a-patent-troll.
Bolton, Nick, "As the Web Turns 25, Its Creator Talks About Its Future," The New York Times (Internet), Mar. 11, 2014.

(56) References Cited

OTHER PUBLICATIONS

Stafford-Fraser, Quentin, "The Trojan Room Coffee Pot a (non-technical) biography," May 1995.
Watanabe, Kenzi et al., "Classroom Lessons of Astronomy Using the Internet and It's Multimedia applications," IEEE, 1996. pp. 389-394.
Sattler, Michael, "Internet TV with CU-SeeMe," 1995, First Edition, Pages Cover, Inside Cover and Publication Information Only. Sams.net ISDN 1-57521-006-1.
Press, Larry, "Net.Speech: Desktop Audio Comes to the Net," Personal Computing, Communications of the ACM, Oct. 1995, vol. 38, No. 10.
"Color PC Video Conferencing is Here!" New Web Site— Video On Internet— comp.misc| Google Groups. May 10, 1995.
Roy, Deb Kumar, "NewsComm: A Hand-Held Device for Interactive Access to Structured Audio," Jun. 1995.
Hassen, paul F., "Pope TV to Transmit Live Video/Audio Cybercast Across the Internet From CICI Homepage," rec.video.cable-tv| Google Groups, Oct. 5, 1995.
Unknown, "Niagara FallsCam Home Page," WaybackMachine, May 10, 1996.
Pitsilos, A.G., "rec.video.production," Making a WebCam— rec.video.production| Google Groups, Nov. 10, 1995.
Sattler, Michael, "Internet TV with CU-SeeMe" Electronic Copy, Chapters 1 through 10 and A through D. 1993.
Goldberg, "The Mercury Project".
Riesenbach, Ron, "The Ontario Telepresence Project," Conference Companion CHI '94, Apr. 24, 1994. Association for Computing Machinery, Boston, MA.
Hodges, Mathew E, et al., "Multimedia Computing," Addison-Wesley Publishing Company, Inc. New York, ISBN 0-201-52029-X.
McGowan, John J., "Networking for Building Automation and Control Systems," 1992, The Fairmount Press, Inc..
Muller, Nathan J., "Computerized Document Imaging Systems: Technology and Applications," 1993, Artech House, Boston.
Hodges, et al., "Multimedia Computing: Case Studies from MIT Project Athena", 1993.
Cen, Shanwei, et al., "A Distributed Real-Time MPEG Video Audio Player," Oregon Graduate Institute of Science and Technology, Portland, Oregon.
Schmandt, Chris, et al., "Audio and Telephone Server for Multi-Media Workstations," Proceedings, Second IEEE Conference on Computer Workstations, 1988, IEEE, Santa Clara, CA.
Jones, Alan, et al., "Handling Audio and Video Streams in a Distributed Environment," pp. 231-243.
Yang, C. "INETPhone: Telephone Services and Servers on Internet," Apr. 1995, University of North Texas.
Wolff, Richard S., et al., "Internetworking Satellite and Local Enchange Networks for Personal Communications Applications.".
Macedonia, Michael R., et al., "MBone Provides Audio and Video Across the Internet," Computer, Apr. 1994, pp. 30-36.
Chen, Zhigang, et al., "Real Time Video and Audio in the World Wide Web," www.w3.org/Conferences/WWW4/Papers/211.
Bruns, G. A., "Strategies for Energy Effeicient Plants and Intelligent Buildings," Proc. of the 9th World Engineering Congree, Oct. 21-24, 1986, pp. v-ix, 71-74.
Carlson, Reinhold A., et al., "Understanding Building Automation Systems," 1991, pp/vii-ix, 51-65, R.S. Means Company, Inc. ISBN 0-87629-211-2.
Chang, Edmond Chin-Ping, "Internet Based Remote Camera Control System," IEEE, Jun. 22, 1996, 0-7803-3652-6.
Everett, H.R., et al., "Controlling Multiple Security Robots in a Warehouse Environment," Mar. 1994.
De Moraes, Luis F.M., et al., "The Internet Multicast from ITS: How It was Done and Implications for the Future," IEEE Communications Magazine, Jan. 1995. pp. 6-8.
Unknown, "Matracom M05— Un Minitel tout terrain", Entreprendre N° 38 Février 1990, at p. 81 ( http://fr.1001mags.com/parution/entreprendre/numero-38-fevrier-1990/page-80- 81-texte-integral).
Goldberg, Ken, et al., "Desktop Teleoperation via the World Wide Web," IEEE International Conference on Robotics and Automation, 1995, pp. 654-659, IEEE.
Kojima, Haruhiko, et al., "Visual Communication System in an Apartment House Using Fiber Optics," 1993, pp. 362-362, IEEE.
Soo, Jonathan C, "Live Multimedia over HTTP.".
Perschau, Stephen, "Transporting Video Teleconferencing Traffic," National Communication System Technical Information Bulletin 93-13, Dec. 1993.
Riesenbach, Ron, et al., "Ontario Telepresence Project," Mar. 1, 1995, Information Technology Research Centre Telecommunicatiosn Research Institute of Ontario.
Paulos, Eric, et al., "Delivering Real Reality to the World Wide Web via Telerobotics," Proc. of the 1996 IEEE Intl. Conf. on Robotics and Automation, Apr. 1996.
Kim, J.H., et al., "Remote Communication for Monitoring and Control of Autonomous Underwater Vehicles," To appear in proceedings of Oceans 96, 1995.
Morlok, E.K., et al., "Vehicle Monitoring and Telecommunication Systems for Enhancement of Trucking Operations," 1989, pp. 356-360, IEEE.
Michalski, Michalski, "Community Part 1", Release 1.0, Jun. 21, 1993. 4 (http://cdn.oreilly.com/radar/r1/06-93.pdf ) (teaching that one way to increase usage of a wired, computer network is to make it accessible using a handheld terminal with a wireless link.), Jun. 21, 1993.
Reisenbach, et al., "The Ontario Telepresence Project," Jan. 2, 1992.
Lin, Charles, "A New Remote-Access Tribe," PC Magazine Feb. 6, 1996.
Vajente-Seguin, "Telemonitoring and Centralized Network Management on Optical Fibres for the RN 90 Olympic Games Highway", Jun. 1991.
Rigney, Steve, "the Norton pcAnywhere 2.0 for Windows," PC Magazine, Aug. 1, 1995.
Wygant, Leslie, "Remote access in Digital's signle package," PC Magazine, Apr. 25, 1995.
Young, "An Equipment Health Monitoring and Fleet Dispatching System for Logging Trucks".
Baruch, John E. F., et al., "Remote control and Robots: an Internet solution," Computing & Control Engineering Journal, Feb. 1996. pp. 39-45.
Feijóo, C. et al., "A System for Fleet Management using Differential GPS and VHF Data Transimission Mobile Networks," IEE Vehicle Navigation & Information Sys. Conf., 1993.
Lin, I-Shein, et al., "A Advanced Telerobotic Control System for a Mobile Robot with Multisensor Feedback," Proc. of Intelligent Autonomous Systems(IAS-4), Mar. 1995, 365-372.
Gault, Helen, et al., "Automatic Vehicle Location and Control at OC Transpo," IEE Vehicle Navigation & Information Systems Conference, 1993. IEEE, Ottawa.
Perlstein, Dan, "Automatic Vehicle Location Systems: A Tool for Computer Aided Despatch Systems of the Future," pp. 186-193, IEEE.
Cain, David., et al., "AVLC Technology Today: A Developmental History of Automatic Vehicle Location and Control Systems for the Transit Environment," IEE Vehicle Navigation & Information Systems Conf., 1993, pp. 581-585. IEEE, Ottawa.
Lombardo, Thomas G., "'Collision-proof' airspace," IEEE Spectrum, Special Report X, Sep. 1980, pp. 85, 87, 86. IEEE.
Banks, K.M., "Datatrak Automatic Vehicle Location System in Operational Use in the UK," pp. 789-796 & Unnumbered 'Figure 4' (1 page).
Jurgen, Ronald K., "And if that isn't enough...," Automotive Application, Oct. 1983, p. 39.
Author Unknown -Urgen, IEEE Spectrum, Oct. 1985, pp. 82-83.
Saldin, Neil P., et al., "Magnavox Automatic Vehicle Location Pilot System for the Toronto Department of Ambulance Services," 1989, pp. 194-201, IEEE.
"Best bits: applications of microprocessors," Mar. 1982, p. 24.
Hurst, G.C., "Quiktrak: A Unique New AVL System," 1989, pp. A-60 to A-62 and p. 126, IEEE.
Halayko, David W., "The Canadian MSAT Field Trails Program," 1992, pp. 376-378, IEEE.

(56) References Cited

OTHER PUBLICATIONS

Rothblatt, Martin, "The First GPS Satellite Radio Optimized for Automatic Vehicle Location," 1992, pp. 524-527, IEEE.
Getting, Ivan A., "The Global Positioning System," IEEE Spectrum, Dec. 1993, pp. 36-47, IEEE.
Ballard, Robert D., "The Jason Remotely Operated Vehicle System," Woods Hole Oceanog. Inst. Tech. Rept. WHOI-93-34, Feb. 1993.
Kaltenberger, Burke R., "Unmanned Air Vehicle/Remotely Piloted Vehicle Analysis for Lethal UAV/RPV," Sep. 1993.
Young, Nolan B., "Using the Global Positioning System (GPS) to Fulfill the Position/Location Requirements of the National Training Center (NTC) and Other U.S. Army Instrumented Testing and Training Ranges," Mar. 1991.
Rigney, "The Norton pcAnywhere 2.0 for Windows".
Fiejoo, "A System for Fleet Management Using Differential GPS and VHF Data Transmission Mobile Network".
Unknown, "Aerospace and Military," Jan. 1993.
Council on Information Mgmt, VA IT GPS Guideline, Jul. 1994.
Unknown, Data Communications, Jan. 1992.
Morlok, Edward K., et al., "Advanced Vehicle Monitoring and Communications Systems for Bus Transit," Final Report DOT-T-94-03, Sep. 1991.
Young, G.G., "An Equipment Health Monitoring and Fleet Dispactincg System for Logging Trucks.", 1999.
Jenning, Nicholas R., et al., "Applying Agent Technology," Applied Artificial Intelligence: An International Journal, 1995, pp. 1-22, vol. 9 Issue 4.
Unkown, IEEE— Spectrum, Oct. 1993.
Unkown, IEEE— Spectrum, May 1995.
Goldberg, Ken, et al., "Desktop Teleoperation via the World Wide Web," IEEE International Conference on Robotics and Automation, 1995. IEEE.
Gerland, Hurst E., "Intelligence on Board Modern Approach to Transit Fleet Management," Vehicle Navigation & Information Systems Conf. Proc., 1994, pp. 557-562, IEEE.
Hermans, Björn, "Intelligent Software Agents on the Internet an inventory of currently offered functionality in the information society & a preidiction of (near-) future developments," Jul. 9, 1996, Tilburg University, Tilburg, The Netherlands.
Unkown, IEEE— How to Frustrate Car Thieves, Oct. 1985.
Tsuzawa, M., et al., "Advanced Mobile Traffic Information and Communication System— AMTICS," 1989, pp. 475-483, IEEE.
Langrock, Donald G., et al., "Advanced Telerobotic Controller," 1994, pp. II-157 to II-162, IEEE.
Adam, A. "Aerospace and Military," Technology '85, Jan. 1985, pp. 85-88, IEEE.
Dooling, Dave, "Aerospace and military," IEEE Spectrum Technology 1993, Jan. 1993, pp. 72-75, IEEE.
Schooley, Larry C., et al., "An Advanced Architecture for Telesystems Applications," 1994 IEEE National Telesystems Conference, 1994, pp. 153-156, IEEE.
Harris, James C., "An Infogeometric Approach to Telerobotics," 1994 IEEE National Telesystems Conference, 1994, pp. 153-156, IEEE.
Illman, J., et al., "An Integrated System for Navigation and Positioning of an ROV for Scientific Exploration," 1993, pp. II-449 to II-503, IEEE.
Hine III, Butler P., et al., "The Application of Telepresence and Virtual Reality to Subsea Exploration.".
Unkown, IEEE Spectrum— Finding Your Way Electronically, Nov. 1982.
Casey, Robert F., et al., "Advanced Public Transportation Systems: The State of the Art Update '98," US Department of Transportation DOT-VNTSC-FTA-97-9, Jan. 1998.
French, Robert L., "Automobile Navigation: Where is it Going?" IEEE AES Magazine, May 1987, pp. 6 to 12, IEEE.
Bradshaw, Jacqueline, et al., "Basic Internet Tools," 1994, 2nd edition, Open Learning Agency, Canada. ISBN 1-55162-195-9.
Perry, Tekla S., "Profile Charles R. Trimble," IEEE Spectrum, Feb. 1992, IEEE.

"Information Techonology Resource Management Guideline Global Positioning System (GPS)," Commonwealth of Virginia COV ITRM Guideline 94-3, Jul. 15, 1994.
Weld, Robert B., "Communications Flow Considerations in Vehicle Navigation and Information Systems," 1989, pp. 373-375, IEEE.
Sarch, Ray, "Data communications," Technology 1993, Jan. 1993, pp. 42-45, IEEE.
Stix, Gary, "Data communications," Technology '90, Jan. 1990, pp. 35-37, IEEE.
Borsook, Paulina, "Data Communications" Technology 1994 IEEE Spectrum, Jan. 1994, pp. 26-29, IEEE.
Segev, Arie, et al., "Designing Electronic Catalogs for Business Value: Results of the CommerceNet Pilot" Oct. 1995.
Diefenbaker, Thomas A., "Development of a Third Generation On-Board Computer System," 1989, pp. 367-369, IEEE.
Sushko, Michael S.K., "DGPS Broadcasts using the Radio Broadcast System (RBDS) for IVHS," IEE Vehicle Navigation & Information Systems Conference, 1993, pp. 312-318, IEEE.
Horgan, et al., "Electronic Watchdogs," IEEE Spectrum, 1985, pp. 43-48, IEEE.
Unknown, "Drivers get more options in 1983," Nov. 1982, p. 35.
Egan, Glenn, "Fleet Management Information Services for the Trasportation Industry," p. 355.
McLellan, James F., et al., "Fleet Management Trials in Western Canada," pp. 797-806.
Feinstein, et al., "Future Weaponry," IEEE Spectrum, Oct. 1982, pp. 91-99, IEEE.
Arora, R. K., et al., "Global Positioning Technology and Applications," 1994, pp. 784-787, IEEE.
Karimi, hassan A., et al., "GPS-Based Tracking Systems for Taxi Cab Fleet Operations," IEE Vehicle Navigation & Information Systems Conference, 1993, pp. 679-682, IEEE.
Reynolds, James C., et al., "GPS-Based Vessel Position Monitoring and Display System," IEEE AES Magazine, Jul. 1990, pp. 16-22, IEEE.
Abelleyro, Ramon J., "Integrated Voice/Telemetry/GPS Location Mobile Radio System for Public Transit; Dallas Area Rapid Transit, Dallas, Texas," IEEE Conference on Selected Topics in Wireless Communication, 1992, pp. 151-153, IEEE.
Rembold, U., et al., "intelligent autonomous systems," 1995, IOS Press, Netherlands.
Harris, C. J., et al., "Intelligent autonomous vehicles: recent progress and central research issues," Computing & Control Engineering Journal, Jul. 1992, pp. 164-171.
Unknown, Ivan Getting Profile, Apr. 1991.
Frankel, David, "ISDN Reaches the Market," IEEE Spectrum, Jun. 1995, pp. 20-25, IEEE.
Aviles, W. A., et al., "Issues in Mobile Robotics: The Unmanned Ground Vehicle Program TeleOperated Vehicle (TOV)," SPIE Mobile Robots V, 1990, pp. 587-597, vol. 1388.
Duchamp, Dan, "Issues in Wireless Mobile Computing," 1992, pp. 2-10, IEEE.
Gerland, Horst E., "ITS Intelligent Transportation System" IEE Vehicle Nav. & Info. Sys. Conf., 1993, pp. 606-611, IEEE.
Perry, Tekla S., "Careers/People," 1991, p.74, IEEE.
Howie, Donald J., et al., "IVHS Applications in Australia," pp. 807-810.
Lang, Larry, "LAN Interconnection: Wide-Area Data Networks," Aug. 1991, p. 38.
Imielinski, Tomasz, et al., "Mobile Wireless Computing: Solutions and Challenges in Data Management," pp. 1-38, Rutgers University, New Brunswick, New Jersey, USA.
Khan, Mobeen, et al., "Mobitex and Mobile Data Standards," IEEE Communications Magazine, Mar. 1995, pp. 96-101, IEEE.
Dooling, Dave, "Navigating close to shore," IEEE Spectrum, Dec. 1994, pp. 24-25, pp. 28-30, IEEE.
Jochem, Todd, et al., "PANS: A Portable Navigation Platform," pp. 107-112. Carnegie Mellon University, Pittsburgh, Pennsylvania, USA.
Kim Kiho, et al., "Remote Manipulator and Its teleoperated Guide Vehicle for Hazardous Waste Sampling Operations," 1994, pp. 2620-2625, IEEE.

(56) References Cited

OTHER PUBLICATIONS

Rosenberg, Paul, "Position-Location/Navigation Systems Overview for Military Land Vehicles," Technical Report No. 12496, Jun. 28, 1979.
Adam, John A., "Satellites and artificial intelligence promise improved safety and efficiency," IEEE Spectrum, Feb. 1991, pp. 27-29, IEEE.
Jurgen, Ronald K., "Smart cars and higways go global," IEEE Spectrum, May 1991, pp. 26, 28-30, IEEE.
Bess, Philip K., "Spread Spectrum Applications in Unmanned Aerial Vehicles," Jun. 1994.
Gomes, Lamberto, et al., "Taxi Emergency and Location System for Metropolitan Toronto," pp. 123-127.
Veiveen, Jan W., et al., "Telematics and Dangerous Goods in the Netherlands," IEE Vehicle Nav. & Info. Sys. Conf., 1993, pp. 653-656, IEEE.
Leighty, Robert D., "Terrain navigation concepts for autonomous vehicles," SPIE Applications of Artificial Intelligence, 1984, pp. 120-125, vol. 485.
Perilstein, Fred M., "The Future Impact of the Microprocessor on Total Transport System Control Functions," 1994, pp. 25-30, IEEE.
Dettmer, Roger, "The Net effect," IEE Review, Mar. 1995, pp. 67-71, IEEE.
Caskey, David L., "The Potential of Intelligent Vehicle Highway Systems for Enhanced Traveler Security," 1993, pp. 117-119, IEEE.
Kaplan, Gadi, "Transportation," Technology '86, Jan. 1986, pp. 73-75, IEEE.
Kaplan, Gadi, "Transportation," Technology '85, Jan. 1985, pp. 81-84, IEEE.
Kaplan, Gadi, et al., "Transportation," Technology '88, Jan. 1988, pp. 59-64, IEEE.
Fellers, Jack W., et al., "Using the Internet to Provide Support for Distributed Interactions," Proc. of the 28th An. Hawaiii Intl. Conf. on Sys. Sciences, 1995, pp. 52-60.
Zhang, Wei-Bin, "Vehicle Health Monitoring for AVCS Malfunction Management," IEE Vehicle Nav. & Info. Sys. Conf., 1993, pp. 501-504, IEEE.
Gates, Harvey M., et al., "Vehicular Positioning System," IEEE AES Magazine, Mar. 1986, pp. 17-19, IEEE.
Chang, Yee-Hsiang, "Wide Area Information Accesses and the Information Gateways," 1994, pp. 21-27, IEEE.
Corr, Frank, et al., "Worldwide Communications and Information Systems," IEEE Communications Magazine, Oct. 1992, PP. 58-63, IEEE.
Kehoe, Brendan P., "Zen and the Art of the Internet," Jan. 1992, First Edition.
Ballard, Christopher M., et al., "Automated Remote Monitoring of Structural Behavior via the Internet:" SPIE, pp. 102-111, vol. 2719.
Garcia, et al., "Monitoring Data in Real time," Dr. Dobb's Journal, Jul. 1996, pp. 56, 58, 60 and 64.
Fuhr, P. L., et al., "An Internet observatory: remote monitoring of instrumented civil structures using the information superhighway," Smart Mater. Struct. 4, 1995, pp. 14-19.
Cordero, et al., "High Speed Network for Delivery of education-on-demand," SPIE, Mar. 25, 1996, pp. 161-172, vol. 2667.
Yang, et al., "Use of Mobitex Wireless Wide Area Networks as a Solution to Land-Based Position and Navigation", Thomas T. Yang and Kai Yan Yip, Jul. 1994.
Houh, et al., Houh, et al., "Active Pages: Intelligent Nodes on the World Wide Web." First Int'l Conf. on the World-Wide Web. 1994.
Peinl, et al., "The Design of a Platform for Mobile Data Communication", 1993.
Tao., et al., "Internet Access via Baseband and Broadband ISDN Gateways", 1994.
Fuhr, et al., "An Internet observatory: Remote Monitoring of Instrumented Civil Structures Using the Information Superhighway", 1994.
Zijderhand, et al., "The Socrates Projects: Progress Towards a Pan-European Driver Information Superhighway", 1993.

Leiner, et al., "The DARPA Internet Protocol Suite", 1985.
Clark, "The Design Philoosophy of the DARPA Internet Protocols", Aug. 1988.
Lemos, "ISDN: A Solution in Search of a Problem", Oct. 1995.
Stallings, "Data and Computer Communications, 3rd Ed.", 1991.
Gage, "Internet Tools for Sharing Unmanned Vehicle Information", May 1994.
Carlson, et al., "Understanding Building Automation Systems", 1991.
Bruns, "Strategies for Energy Efficient Plants and Intelligent Buildings", 1986.
Uehara, et al., "InternetCAR: Internet-Connected Automobiles", http://noc.aic.net/net98/1f/1f_2.html, Jul. 1997.
"Official Product and Show Guide." Ashrae Journal, vol. 32, No. 1, Jan. 1990.
McGowan, "Chapter 6: The System Operator Interface (SOI)." Network for Building Automation and Control Systems, 1992.
Noore, et al., "Computer-Based Multimedia Video Conferencing System." IEEE, pp. 587-592, 1993.
Ballard, et al., "Automated Remote Monitoring of Structural Behavior via the Internet", SPIE vol. 2719, Apr. 1996.
Garcia, et al., (Dr. Dobbs Journal), Monitoring Data in Real Time (Remote Access to Laboratories):. Dr, Dobb's Journal, Jul. 1996.
Cordero, et al., "High Speed Network for Delivery of Education-on-Demand", SPIE vol 2667, Mar. 25, 1996.
Perschua, National Communication System, Technical Information Bulletin 93-13, Dec. 1993.
PictureWindow Software, BBN Systems and Technologies of Cambridge, MA.
"College Interns Use the Internet to "video commute"to Work." Business Wire, Mar. 21, 1995.
Grossman, "Communications:Picture the Scene: Wendy Grossman Looks at the technology that makes possible videobroadcasting over the Internet." The Guardian 4, Jan. 26, 1995.
Commercializedor publicly available militaryor government systems relating to the lunar rovers, statllite controllers,and the space shuttle program. Www.zianet.com/tangoz/fourgrnd/History2.Html.
Commercializedor publicly available militaryor government systems relating to the lunar rovers, statllite controllers,and the space shuttle program.
Voyager 1 and Voyager 2. voyager.jpl.nasa.gov; deepspace.jpl.nasa.go/dsn/.
"Lunokhod 1 lunar rover" en.wikipedia.org/wiki/Roger_%28space_exploration%29.
McGowan, "Networking for Building Automation Control Systems," 1992.
Richard Cogger NSF Grant Application Abstract.
MCS Page.
news.announce.conferences web page.
Cen, et al., "A Distributed Real-time MPEG Videio Audio Player".
Jones, et al., "Handling Audio and Video Streams in a Distributed Environment".
Yang, "INETPhone: Telephone Services and Servers on Internet".
Wolff, et al., "Internetworking Satellite and Local Exchange Networks for Personal Communication Applications".
Macedonia, et al., "Mbone Provides Audio and Video Across the Internet".
Press, Net.Speech: Desktop Audio Comes to the Net.
comp.misc web page.
rec.video.cable-tv web page.
Chen, et al., "Real Time Video and Audio in the World Wide Web".
Niagara Falls Cam Web Page.
Bod Metcafe's Article about the Trojan Room Coffee Pot web page.
Soo, "Live Multimedia over HTTP".
rec.video.production web page.
rec.video.
Mattheij, "My Brush With a Patent Troll".
Bilton, "As the Web Turns 25, Its Creator Talks About Its Future".
Reisenbach, et al., "Ontario Telepresence Project, Final Report," Mar. 1, 1995.

* cited by examiner

VEHICLE OPERATOR AND/OR OCCUPANT INFORMATION APPARATUS AND METHOD

RELATED APPLICATIONS

This application claims the benefit of priority of U.S. Provisional Patent Application Ser. No. 60/076,800, filed Mar. 4, 1998, and entitled "VEHICLE OPERATOR AND/OR OCCUPANT INFORMATION APPARATUS AND METHOD".

FIELD OF THE INVENTION

The present invention is directed to a vehicle operator and/or occupant information apparatus and method and, in particular, to a vehicle operator and/or occupant information apparatus and method for providing a vehicle operator and/or occupant with information regarding traffic conditions, road conditions, traffic flow, and other useful information.

BACKGROUND OF THE INVENTION

Each day millions of individuals rely on using their vehicles as the means by which to get from one location to another. As the number of drivers and vehicles on the road increase, so to have traffic and congestion on roads, at bridges, at toll booths, at tunnels, at parking lots and on, or at, other thoroughfares and/or locations.

In today's age, the importance of getting from one location to another can be paramount. As we, as a society, become more productive and move deeper into the information age, it is more and more important for individuals to have an awareness and information pertaining to the locales in which they are driving or traveling, the destinations to which they are headed, as well as the roadways, bridges, toll booths and tunnels which they must travel or use along the way. In today's information age, vehicle operators could greatly benefit from an apparatus and method which could provide a vehicle operator and/or occupant with information regarding the traffic and/or conditions of roadways, highways, brides, toll booths, tunnels, parking lots, etc.

SUMMARY OF THE INVENTION

The present invention provides an apparatus and a method for providing a vehicle operator and/or occupant with information regarding traffic conditions as well as conditions of roadways, highways, bridges, toll booths and tunnels, as well as other roads and/or thoroughfares upon which a vehicle may travel, along with other destinations and/or entities of interest. In a preferred embodiment, the apparatus and method of the present invention provides video information to a vehicle operator and/or occupant regarding the conditions of roadways, highways, bridges, toll booths and tunnels as well as other roads and/or thoroughfares upon which a vehicle may travel, as well as other destinations and/or entities of interest.

In this regard, the present invention provides an apparatus and a method for providing a vehicle operator and/or occupant with information regarding road traffic conditions, traffic on roadways, highways, parkways, expressways, traffic and/or congestion at, or on, bridges, at tunnels and at other locations on a roadway. The present invention can also provide a vehicle operator or occupant with information concerning conditions at toll booths, public areas, public parking lots and other destinations and/or locations.

The present invention provides video information and/or a video image, along with other information, of the conditions of a roadway, a bridge, a tunnel, a toll booth, a parking lot, a public parking lot, such as at shopping malls, at stores, at beaches, and at sports or other entertainment facilities, etc. The video information is provided to the vehicle operator and/or occupant on a display device located in the vehicle. The vehicle operator or occupant may then utilize the information obtained in order to be apprised of traffic and other conditions, during their travels. For example, a driver headed to a destination may utilize the present invention in order to view the traffic conditions on several alternate roadways or at bridges, tunnels or toll booths along the way. The driver may then utilize this information in order to travel the least congested route.

The apparatus comprises a vehicle computer. The vehicle computer which is utilized should provide for convenient use by the vehicle operator and/or occupant. The vehicle computer should at least have its display and user input device located on or in the vehicle dashboard or console. The vehicle computer may be mounted in the vehicle in the same manner as driver information centers and/or navigation computers.

The apparatus also comprises a central processing computer which provides control over the apparatus and which services the vehicle computer. The central processing computer and the vehicle computer communicate with one another over an appropriate or suitable wireless communication network. In the preferred embodiment, the present invention is utilized on and/or over the Internet and/or the World Wide Web and, in particular, a wireless Internet and/or World Wide Web communication network and/or system. In this regard, the present invention, in the preferred embodiment, utilizes wireless Internet and/or World Wide Web services, equipment and/or devices. The central processing computer has a Web Site associated with it. The vehicle computer can access the Web Site of the central processing computer.

Although the Internet and/or the World Wide Web is the preferred communication system and/or medium utilized, it is important to note that the present invention, in all of the embodiments described herein, can be utilized with any appropriate communication systems including, but not limited to network communication systems, telephone communication systems, cellular communication systems, digital communication systems, personal communication systems, personal communication services (PCS) systems, satellite communication systems, broad band communication systems, low earth orbiting (LEO) satellite systems and line telephone systems.

The apparatus further comprises a plurality of video cameras and location computers which are associated with each of the video cameras. The location computers are electronically and/or operatively connected to its respective video camera for providing control over the video camera. Video information, which is recorded by the respective video camera, is provided to the location computer which services the respective video camera. Each location computer has a web site associated therewith.

The central processing computer can access the Web Sites of each of the location computers. The vehicle computer can access the web sites of the location computers via the Web Site associated with the central processing computer on, or over, the Internet and/or the World Wide Web. The vehicle computer can also access the web sites of the location computers directly on, or over, the Internet and/or the World Wide Web. In this manner, the video information recorded by each of the video cameras may be accessed by the vehicle computer and by the central processing computer so that the vehicle operator and/or occupant can obtain the video information at the vehicle computer.

The central processing computer can include a database which contains all of the data and information necessary to provide service to, and perform any of the herein-described functions of, any number of vehicle computers.

The apparatus of the present invention may be utilized in conjunction with any appropriate and/or suitable communication network. In the preferred embodiment, however, the apparatus is utilized in conjunction with the Internet and/or the World Wide Web. In this manner, the video camera location video is obtainable by the vehicle operator and/or occupant by accessing either the central processing computer or the selected location computers on, or over, the Internet and/or the World Wide Web by accessing the web sites associated with these respective computers.

Each of the location computers is linked to the central processing computer which services a given region or geographic area. The processing computer, in this manner, can control and obtain information, including video information, from the respective video cameras.

The apparatus also comprises a global positioning device which is located at the vehicle and a database which is also located at the vehicle. The database stores any pre-determined number of locations such as video camera locations on, or near, roadways, highways, expressways, parkways, bridges, toll booths, toll booth plazas, tunnels, shopping mall parking lots, beach parking lots, store parking lots, entertainment and/or sports facilities parking lots and any other location which would be of interest to a vehicle operator and/or occupant.

The names and location data pertaining to the video camera locations, along with the uniform resource locators (URLs) for the respective location computers, and the links therefor, are also stored in the database. The above information can be correlated with vehicle location data which is obtained by the global positioning device. In this manner, the vehicle operator and/or occupant may be advised of those locations which may be of interest to him or her from any location.

After the global positioning device determines vehicle position, the position data may be cross correlated with the location data and other data available in the database so as to provide the vehicle operator and/or occupant with a selection of locations for which he or she may obtain video or other information over the Internet and/or the World Wide Web.

Each of the video cameras, in the preferred embodiment, is stationed and/or located at appropriate viewing locations on, near, or at a location for viewing, roadways, at entrances and exits to roadways, on highways, expressways, on parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, stores, beaches, sports facilities as well as arenas and entertainment facilities and centers.

Although each of the video cameras may be turned on or off, in the preferred embodiment, the video cameras are in operation 24 hours a day, seven days a week so as to provide continuous surveillance of the roadway, highway, expressway, parkway, bridge, tunnel, toll booth, toll booth plaza, parking lot, or other entity or location, to which it is assigned.

The video cameras, in the preferred embodiment, are stationed on poles, road signs, buildings, overpasses, walls and other appropriate structures adjacent to, near, on, or at, a location for viewing, roadways, highways, expressways, along bridges and tunnels, and parking lots. The video cameras can also be stationed along roadways, highways, expressways, highways, along bridges and tunnels, and parking lots, at any desired intervals. For example, a video camera can be stationed at the entrance to, and at the exit ramps, at mile or other distance markers, and on signs on any of the above described roadways, highways, expressways, along bridges and tunnels, in parking lots, and in various locations adjacent to, near, or at, a location for viewing, same.

A plurality of vehicle computers may be utilized in conjunction with the present invention so that the present invention can be utilized to provide information to a large number of vehicles and to their operators and/or occupants. The present invention may also comprise a plurality of central processing computers which are typically server computers each of which may be linked with a pre-defined number of location computers assigned to provide service to a pre-defined geographic and/or regional area. In this manner, the present invention may be utilized to provide information and coverage for a very large geographic area. The present invention can be utilized to provide information and coverage internationally.

The present invention, as described above, provides information pertaining to traffic and other conditions on roadways, at entrances and exits to roadways, on highways, expressways, parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and at arenas, as well as at entertainment facilities and centers.

A vehicle operator and/or occupant may obtain video information about a selected location simply by accessing either the central processing computer or the location computer which services the video camera at the selected location or locations, at any time. The information which is provided by the present invention can be utilized in assisting a vehicle driver and/or occupant to determine and/or find the most optimal or the least congested route to their destination. For example, a driver headed to a destination may utilize the present invention in order to view the traffic conditions on several alternate roadways, bridges, tunnels or toll booths, along the way. The driver may then utilize this information in order to travel the least congested route.

In an alternate embodiment, the present invention may be utilized to provide all of the information described above regarding locations to a user over a home or a personal computer, including a laptop computer, a handheld computer, a palmtop computer, a television, an interactive television, a digital television, a personal digital assistant, a telephone, a digital telephone, a personal communication device, and a personal communications services device. In this manner, information about any of the herein-described locations can be available to a user at, or from, any location.

The present invention describes an apparatus and a method for providing the above-described information about the above-described locations so as to provide a vehicle operator and/or occupant with valuable information concerning the roadways, bridges, tunnels, toll booths and/or parking lots, which would enable the vehicle operator and/or occupant to make informed driving and/or traveling decisions. For example, a vehicle operator traveling to a given destination, may wish to view various locations along the way to his or her destination. By utilizing the apparatus and method of the present invention, the vehicle operator may view roadways, bridges, tunnels, toll booths, along the way, so as to select the route with the least traffic, congestion or traffic delays.

Further, the apparatus and method of the present invention provides an embodiment for allowing a user of a home or personal computer to obtain the same information from his or her home or other location so as to more carefully plan out his or her trip beforehand.

The present invention can provide an apparatus and a method for providing hands-free use by a vehicle operator or driver.

In any of the preferred embodiments described herein, vehicle location data may be entered and/or updated manually by the vehicle operator or occupant such as by selecting location or position information from a menu selection. The apparatus and method of the present invention can ascertain a travel route and provide information pertaining to different locations or points along the travel route.

The apparatus and method of the present invention can provide video and other information about a travel route or location or point along, or on, a travel route, in real-time. The present invention also provides and apparatus and a method to allow an individual to preview a planned or anticipated travel route from any location or place.

The present invention provides real-time traffic conditions, road conditions and weather conditions and provides valuable information to any traveler.

Accordingly, it is an object of the present invention to provide an apparatus and a method for providing a vehicle operator and/or occupant with information.

It is another object of the present invention to provide an apparatus and a method for providing a vehicle operator and/or occupant with information regarding traffic conditions, road conditions, traffic flow, or other useful information.

It is another object of the present invention to provide an apparatus and a method for providing a vehicle operator and/or occupant with information regarding conditions of roadways, highways, bridges, toll booths and tunnels, as well as other roads, thoroughfares, or destinations and/or other entities of interest.

It is still another object of the present invention to provide an apparatus and a method for providing a vehicle operator and/or occupant with video information and/or a video images, along with other travel-related information.

It is yet another object of the present invention to provide an apparatus and a method for providing a vehicle operator and/or occupant with information which is utilized on, or over, a communication network.

It is another object of the present invention to provide an apparatus and a method for providing a vehicle operator and/or occupant with information which is utilized on, or over, the Internet and/or the World Wide Web.

It is yet another object of the present invention to provide an apparatus and a method for providing a vehicle operator and/or occupant with information from any location.

It is still another object of the present invention to provide an apparatus and a method for providing a vehicle operator and/or occupant with information which provides for hands-free operation.

It is still another object of the present invention to provide an apparatus and a method for providing a vehicle operator and/or occupant with information which also provides for manual, as well as automatic, entry of vehicle location data or information.

It is yet another object of the present invention to provide an apparatus and a method for providing a vehicle operator and/or occupant with information pertaining to different locations or points along a travel route.

It is another object of the present invention to provide an apparatus and a method for providing a vehicle operator and/or occupant with information which determines a travel route and provides information pertaining to different locations or points along the travel route.

It is still another object of the present invention to provide an apparatus and a method for providing a vehicle operator and/or occupant with information about a travel route or location or point along, or on, a travel route.

It is yet another object of the present invention to provide an apparatus and a method for providing a vehicle operator and/or occupant with a preview of a planned or anticipated travel route.

It is yet another object of the present invention to provide an apparatus and a method for providing a vehicle operator and/or occupant with travel-related information in real-time.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENTS

The present invention provides an apparatus and a method for providing a vehicle operator and/or occupant with information regarding traffic conditions as well as conditions of roadways, highways, bridges, toll booths and tunnels, as well as other roads and/or thoroughfares upon which a vehicle may travel, along with other destinations and/or entities of interest. In a preferred embodiment, the apparatus and method of the present invention provides video information to a vehicle operator and/or occupant regarding the conditions of roadways, highways, bridges, toll booths and tunnels as well as other roads and/or thoroughfares upon which a vehicle may travel, as well as other destinations and/or entities of interest.

In this regard, the present invention provides an apparatus and a method for providing a vehicle operator and/or occupant with information regarding road traffic conditions, traffic on roadways, highways, parkways, expressways, traffic and/or congestion at, or on, bridges, at tunnels and at other locations on a roadway. The present invention can also provide a vehicle operator or occupant with information concerning conditions at toll booths, public areas, public parking lots and other destinations and/or locations.

The present invention provides video information and/or a video image, along with other information, of the conditions of a roadway, a bridge, a tunnel, a toll booth, a parking lot, a public parking lot, such as at shopping malls, at stores, at beaches, and at sports or other entertainment facilities, etc. The video information is provided to the vehicle operator and/or occupant on a display device located in the vehicle. The vehicle operator or occupant may then utilize the information obtained in order to be apprised of traffic and other conditions, during their travels. For example, a driver headed to a destination may utilize the present invention in order to view the traffic conditions on several alternate roadways or at bridges, tunnels or toll booths along the way. The driver may then utilize this information in order to travel the least congested route or to make other travel related decisions based upon the information obtained.

Figure 1:
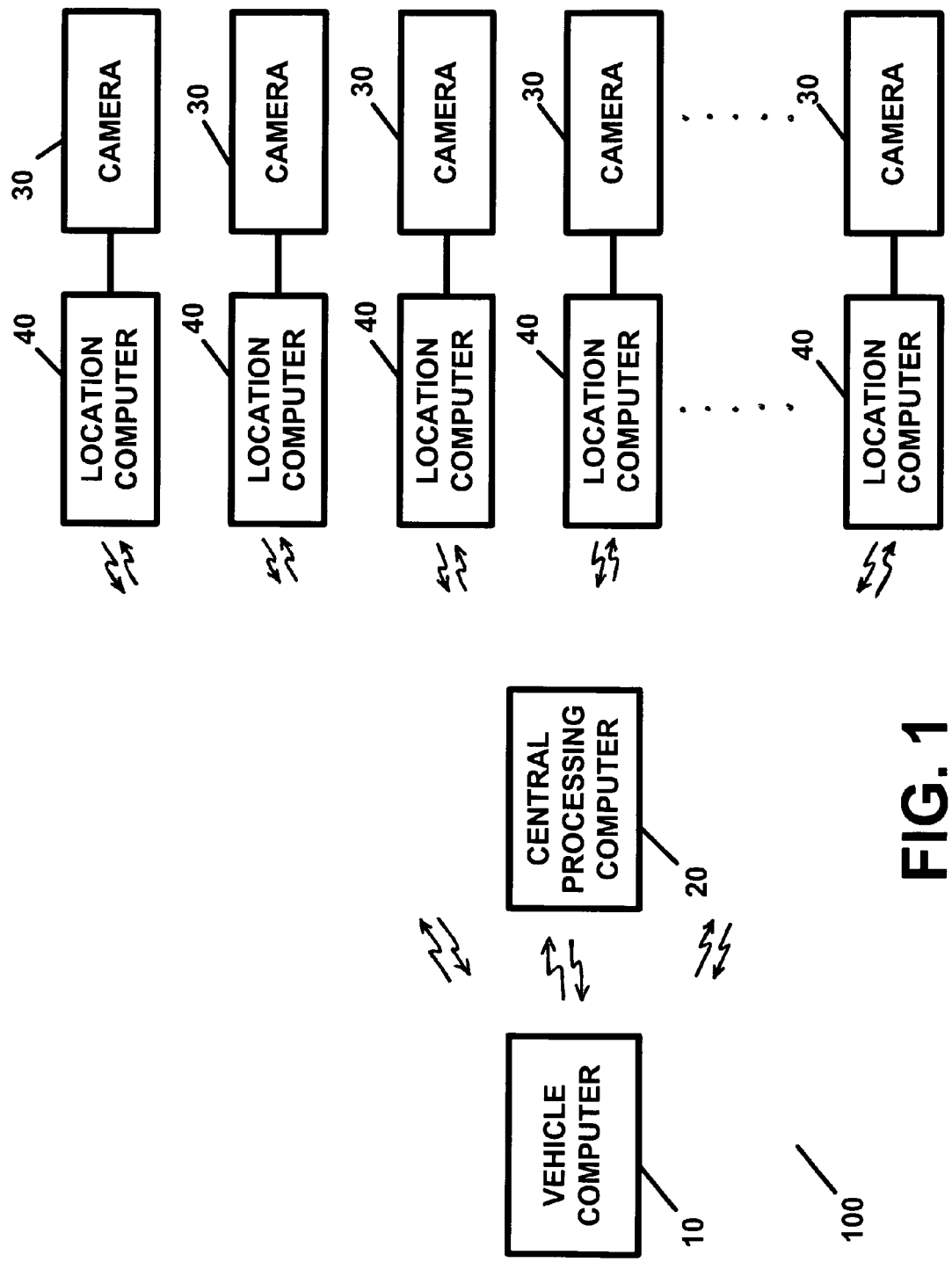
FIG. 1 illustrates the apparatus of the present invention, in block diagram form.

Applicant hereby incorporates by reference herein the subject matter of U.S. Provisional Patent Application Ser. No. 60/076,800. FIG. 1 illustrates a preferred embodiment of the apparatus of the present invention which is designated generally by the reference numeral 100. In FIG. 1, the apparatus 100 includes a vehicle computer 10. The vehicle computer 10, in the preferred embodiment, is a personal computer. Although any type of personal computer and/or laptop computer may be utilized, in the preferred embodiment, the vehicle computer 10 can be an integral part of the vehicle so that it will provide for convenient use by the vehicle operator and/or occupant.

In the preferred embodiment, the vehicle computer 10 should at least have its display and user input device located on, in, or adjacent to, the vehicle dashboard or console. In this manner, the vehicle computer 10 may be mounted in the vehicle in the same manner that driver information centers and/or navigation computers are mounted therein.

The apparatus 100 also includes a central processing computer 20 which provides control over the apparatus 100 and which services the vehicle computer 10. In the preferred embodiment, any number of central processing computers 20 may be utilized in order to provide the servicing functions described herein. The apparatus 100 may contain any number of central processing computers 20. In such an embodiment, a given central processing computer 20 may service a particular geographic area.

The central processing computer(s) 20 and the vehicle computer 10 can communicate with one another over a wireless communication network. In the preferred embodiment, the present invention is utilized on, and/or over, the Internet and/or the World Wide Web and, in particular, a wireless Internet and/or World Wide Web communication network and/or system. In this regard, the present invention, in the preferred embodiment, utilizes wireless Internet and/or World Wide Web services, equipment, and/or devices. The central processing computer(s) 20, in the preferred embodiment, can have a web site or web sites associated therewith.

Although the Internet and/or the World Wide Web is the preferred communication system and/or medium utilized, the present invention, in all of the embodiments described herein, can be utilized with any appropriate communication systems including, but not limited to, network communication systems, telephone communication systems, cellular communication systems, digital communication systems, personal communication systems, personal communication services (PCS) systems, satellite communication systems, broad band communication systems, low earth orbiting (LEO) satellite systems and line telephone systems.

The apparatus 100 also includes a plurality of video cameras 30. Each of the video cameras 30, in the preferred embodiment, has associated therewith a location computer 40. The location computers 40 are electrically and/or operatively connected to its respective video camera 30 for providing control over the respective video camera 30. In the preferred embodiment, each location computer 40 has a web site associated therewith. Any number of location computers 40 may be accessed by one or more of the central processing computers 20. The vehicle computer 10 and the central processing computer(s) 20 can access the web sites of each of the location computers 40.

The vehicle computer 10 can access the web sites of the location computers 40 via the web site(s) associated with the central processing computer(s) 20, over the Internet and/or the World Wide Web. The vehicle computer 10 can also access the web sites of the location computers 40 directly over the Internet and/or the World Wide Web. The video information which is recorded by the video camera 30 may be accessed by the vehicle computer 10 and/or by the central processing computer(s) 20 so that the vehicle operator and/or occupant can obtain the video information at the vehicle computer 10.

In cases where the apparatus 100 is used with other communication systems, the vehicle computer 10, the central processing computer(s) 20, and the location computers 40, can be equipped with appropriate transmitters and receivers and/or other communication equipment or peripherals.

The video from each of the video cameras 30 is available at the web site of its associated location computer 40. The video from the each of the video cameras 30 is then available to the vehicle computer 10 via the central processing computer(s) 20. The video from each of the video cameras 30 is also available to the vehicle computer 10 via each of the web sites of the respective location computers 40. In the preferred embodiment, the location computers 40 also communicate with the central processing computer(s) 20 on, or over, the Internet and/or the Wide Web.

Each of the location computers 40 is linked to the central processing computer(s) 20. The central processing computer(s) 20, in this manner, can control and obtain information, including video information, from the respective video cameras 30. In the preferred embodiment, the uniform resource locator (URL) for each of the location computers 40 is provided at the central processing computer(s) 20. In the above manner, each video camera 30 which is utilized with the apparatus 100 of the present invention, can be associated with a uniform resource locator which is an assigned address distinct to the respective location computer 40 and video camera 30.

Any of the central processing computers 20, in the preferred embodiment, can be a server computer which supports a web site which provides the links to a plurality of the location computers 40 which are utilized in conjunction with the apparatus 100. The location computers 40, in the preferred embodiment, are also server computers which can be accessed by the vehicle operator or occupant via the central processing computer(s) 20 and/or the web site associated therewith. Each of the location computers 40, can provide control over the video camera 30 associated therewith. The operation of any one of the location computers 40 can be controlled via the central processing computer(s) 20.

The vehicle operator and/or occupant can directly access each of the location computers 40 via the vehicle computer 10. In this regard, the vehicle operator and/or occupant may simply access a location computer 40 via its uniform resource locator, or link, which can be provided to, and at, the vehicle computer 10.

Figure 2:
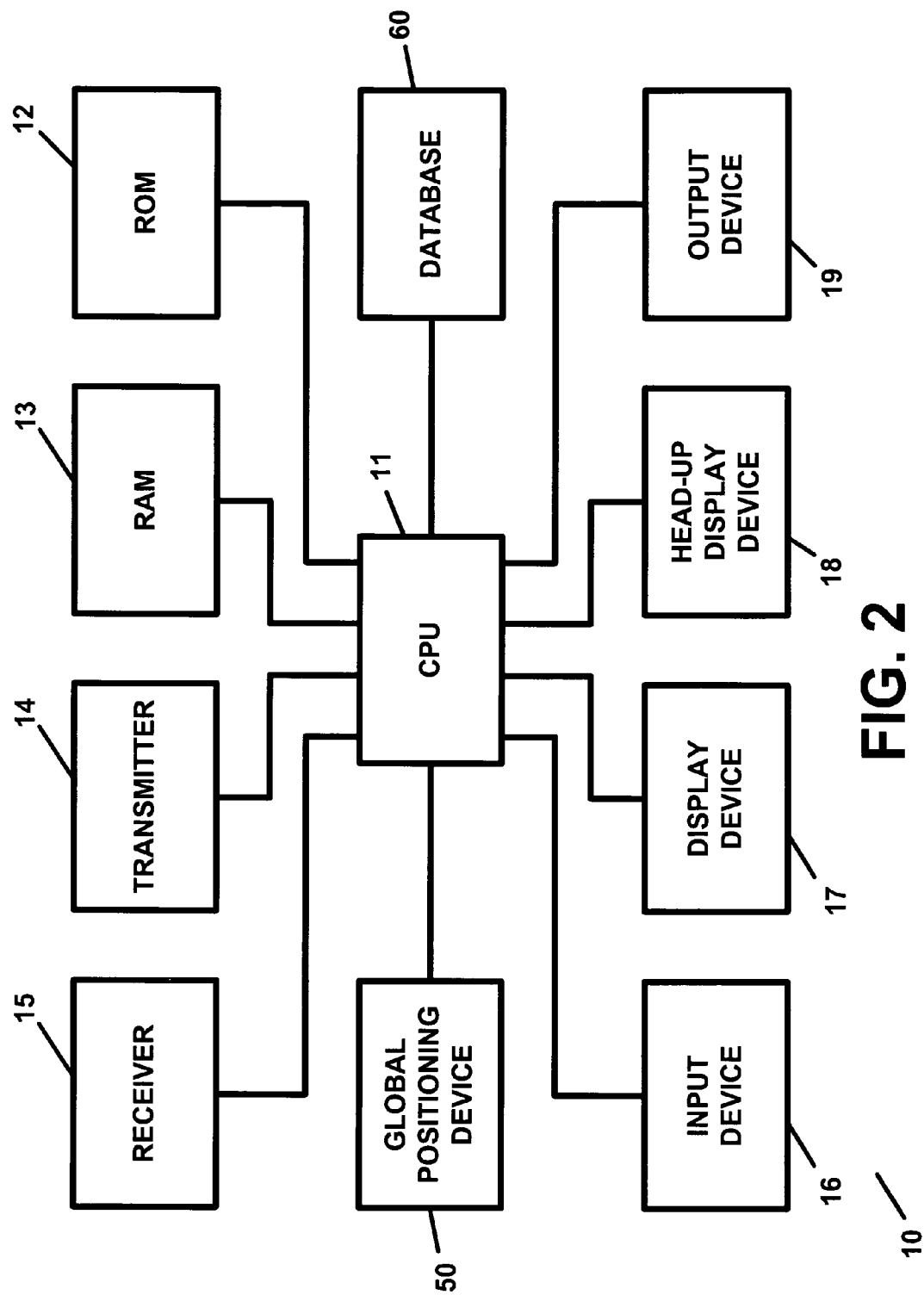
FIG. 2 illustrates the vehicle computer of FIG. 1, in block diagram form.

FIG. 2 illustrates the vehicle computer 10 of FIG. 1, in block diagram form. In FIG. 2, the vehicle computer 10 includes a central processing unit (CPU) 11 which controls the processing of the vehicle computer 10. The vehicle computer 10 also includes a read only memory (ROM) 12, which is electrically connected to the CPU 11. The vehicle computer 10 also includes a random access memory (RAM) 13, which is electrically connected to the CPU 11.

The vehicle computer 10 also includes a transmitter 14 for transmitting signals to the central processing computer(s) 20 or transmitting signals to any of the location computers 40 which are utilized with the apparatus 100. The vehicle computer 10 also includes a receiver 15 for receiving signals from the central processing computer(s) 20 or for receiving signals from any of the location computers which are utilized in conjunction with the apparatus 100.

The vehicle computers 10, as well as the central processing computers 20, and the location computers 40, which are utilized in the apparatus 100 of the present invention, include the necessary equipment and/or peripherals to operate on, or over, the Internet and/or the World Wide Web. The vehicle computer 10 also includes an user input device 16 for facilitating user input of commands and data into the vehicle computer 10. The user can thereby utilize the user input device 16 to exercise control over, and operate, the vehicle computer 10.

The user input device 16 is also electrically connected to the CPU 11. In the preferred embodiment, the user input device 16 includes a keypad and a pointing device. The pointing device, in the preferred embodiment, is a mouse, a mouse-like device, a roll ball, a touch pad, a combination of the above devices, or any other known computer pointing device. In the preferred embodiment, the user input device 16 includes a keypad and a mouse-like pointing device.

The vehicle computer 10 also includes a display device 17 which is also electrically connected to the CUP 11. The display device 17 provides a video or visual display of information to the vehicle operator and/or occupant. The display device 17, in the preferred embodiment, is mounted on, or adjacent to, the vehicle dashboard or console, at a location for easy viewing and operation by the operator and/or occupant. The display device 17 also provides the apparatus 100 with a graphical user interface (GUI) capabilities.

The vehicle computer 10 also includes a head up display device 18 for providing information to the vehicle operator on the windshield so that the operator may view the information without having to remove his or her eyes from the road. The vehicle computer 10 also includes an output device 19 which is also electrically connected to the CPU 11. The output device 19 can be any suitable output device for providing information to the vehicle operator or occupant. In the preferred embodiment, the output device 19 is a printer.

Each of the central processing computers 20, and the location computers 40, will have web sites and URLs associated therewith so that all of the above computers are accessible over the Internet and/or the World Wide Web.

The vehicle computer 10, in the preferred embodiment, also includes a global positioning device 50 for determining the position and/or location of the vehicle. The vehicle computer 10 also includes a database 60 for storing the names, locations, addresses, and URLs, for any predefined group and/or for all of the central processing computers 20 and the location computers 40 which are utilized in conjunction with the present invention. The database 60 also stores information concerning the locations of various roadways or highways, at points on, near, or adjacent to these roadways or highways, at entrances and exits to these roadways or highways, including expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, stores, beaches, sports facilities and arenas and entertainment facilities and centers, which are monitored and/or covered by the apparatus 100.

The database 60 also contains the locations for any number of locations, such as video camera locations, on roadways, highways, expressways, parkways, bridges, toll booths, toll booth plazas, tunnels, shopping mall parking lots, beach parking lots, store parking lots, entertainment and/or sports facilities parking lots, and any other location which would be of interest to a vehicle operator and/or occupant.

The database 60 also contains location data or information, which includes the latitude and longitude for any of the locations along roadways, highways, expressways, parkways, and/or exits, overpasses or other points of interest along same, bridges, tunnels, toll booths or toll booth plazas, or destinations of interest, etc.

The database 60 also contains travel route data or information between locations and/or between locations and destinations. Locations data or information for cameras along a given route or given routes can be linked utilizing database management techniques in or to provide data or information along or for a given travel route. The database 60 also contains location data and information for any of the various cameras 30.

In any of the embodiments described herein, any location data or information may include latitude and longitude data or information and/or any other suitable data or information for identifying a given location.

In any of the embodiments described herein, the data and/or information stored in the database 60 may be obtained via data or information which is pre-stored in same, data or information which is loaded into the vehicle computer 10 from a storage medium such as a floppy disk, a diskette, a compact disk, or a digital video disk, or via any other storage medium, or data or information which is downloaded from any of the central processing computers 20 which are utilized in conjunction with the present invention. The vehicle computer 10, in order to accommodate data and information loading, may include a respective floppy disk drive, diskette drive, compact disk drive, or digital video disk drive.

The database 60 can be updated by updates obtained from any of the central processing computers 20 and/or the location computers 40 which are utilized with the present invention. The updates can be obtained on, or over, the Internet and/or the World Wide Web.

The names and location data pertaining to the video camera locations, along with the URLs for the respective location computers 40, along with links thereto or therefor, including hyperlinks, are also stored in the database 60. The above information can be correlated with vehicle location data which is obtained by the global positioning device 50. In this manner, the vehicle operator and/or occupant may be advised of those locations which may be of interest to him or her from any location. After the global positioning device 50 determines vehicle position, the position data may be cross correlated with the location data and other data available in the database 60 so as to provide the vehicle operator and/or occupant with a selection of locations which he or she may obtain video or other information.

The vehicle computer 10 may also be programmable so that the vehicle operator or occupant can enter vehicle position data and destination data into the vehicle computer 10. The vehicle computer 10 can be programmed so that, the driver or occupant can obtain video information and updates pertaining thereto for locations up ahead in their travels. The vehicle operator or occupant can also request and receive video information and updates for alternate routes up ahead in their travels.

Vehicle position data may be obtained via the global positioning device 50. Vehicle position data may also be entered manually by the vehicle operator or occupant.

The present invention, as described above, provides information pertaining to traffic and other conditions on roadways, highways, expressways, or parkways, at entrances and exits to roadways, highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and arenas and at entertainment facilities and centers, which are monitored by the apparatus 100.

In another preferred embodiment, the display device 17, which is utilized, is provided with a screen for viewing a plurality of video images at the same time so that the vehicle operator or occupant may request and/or receive from, or about, a plurality of locations. In this manner, the vehicle operator or occupant can obtain, for simultaneous viewing, a plurality of video images and/or other information for a plurality of locations. For example, a vehicle operator traveling to a location accessible by a plurality of bridges may receive video of the toll booth plazas for each bridge.

In the preferred embodiment, the database 60 stores the uniform resource locators (URLs) for any number of location computers 40 which are associated with the various locations of the video cameras 30. The location information stored in the database may be downloaded from the central processing computer(s) 20 which service the respective region. In this manner, the database 60 may be updated by the central processing computer 20 for a given region each time it enters a new region. The database 60 may also contain location information which can be loaded into the vehicle computer by the vehicle operator or occupant. The database 65 also stores information concerning travel routes between locations or destinations.

Figure 3:
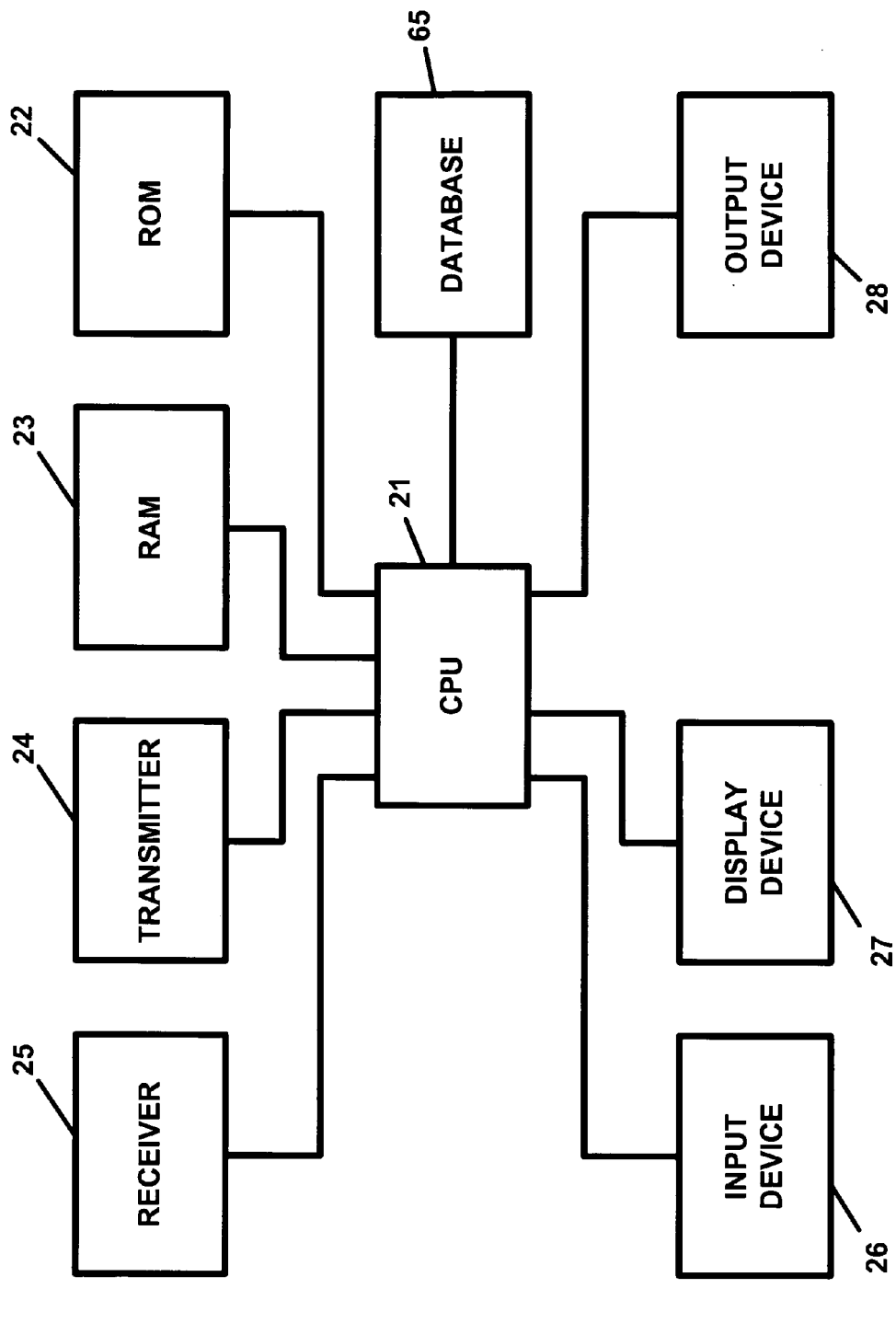
FIG. 3 illustrates the central processing computer of FIG. 1, in block diagram form.

FIG. 3 illustrates the central processing computer 20 of FIG. 1, in block diagram form. In FIG. 3, the central processing computer 20 includes a central processing unit (CPU) 21 which controls the processing of the central processing computer 20. The central processing computer 20 also includes a read only memory (ROM) 22, which is electrically connected to the CPU 21. The central processing computer 20 also includes a random access memory (RAM) 23, which is electrically connected to the CPU 21.

The central processing computer 20 also includes a transmitter 24 for transmitting signals to the vehicle computers 10 and for transmitting signals to the location computers 40 which are utilized with the apparatus 100. The central processing computer 20 also includes a receiver 25 for receiving signals from the vehicle computers 10 or for receiving signals from the location computers 40 which are utilized in conjunction with the apparatus 100 of the present invention.

The central processing computers 20, as well as the vehicle computers 10 and the location computers 40, which are utilized with the apparatus 100 of the present invention, include the necessary equipment and/or peripherals needed to operate on, or over, the Internet and/or the World Wide Web. The central processing computer 20 also includes an user input device 26 for facilitating user input of commands and data into the central processing computer 20. The user can thereby utilize the user input device 26 to exercise control over, and operate, the central processing computer 20.

The user input device 26 is also electrically connected to the CPU 21. In the preferred embodiment, the user input device 26 includes a keypad and a pointing device. The pointing device, in the preferred embodiment, is a mouse, a mouse-like device, a roll ball, a touch pad, a combination of the above devices, or any other known computer pointing device. In the preferred embodiment, the user input device 26 includes a keypad and a mouse-like pointing device.

The central processing computer 20 also includes a display device 27 which is also electrically connected to the CPU 21. The display device 27 provides a video or visual display of information to the user or operator of the central processing computer 20. The display device 27 also provides the apparatus 100 with a graphical user interface (GUI) capabilities.

The central processing computer 20 also includes an output device 28 which is also electrically connected to the CPU 21. The output device 28 can be any suitable output device for providing information to the user or operator of the central processing computer. In the preferred embodiment, the output device 28 is a printer.

The central processing computer 20 also includes a database 65 for storing the names, locations, addresses, and URLs, for any predefined group and/or all of the central processing computers 20 and the location computers 40 which are utilized with the present invention. The database 65 also stores data and/or information concerning the vehicle operators, occupants, and vehicles, which utilize or subscribe to, or which are utilized with, respectively, the services which are provided by the apparatus and method of the present invention.

The database 65 also stores information about the various roadways, at entrances and exits to roadways, on highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, stores, beaches, sports facilities and arenas and entertainment facilities and centers, which are monitored and/or covered by the apparatus 100. The database 65 also stores information concerning travel routes between locations or destinations.

The database 65 stores any pre-determined number of locations such as video camera locations on roadways, highways, expressways, parkways, bridges, toll booths, toll booth plazas, tunnels, shopping mall parking lots, beach parking lots, store parking lots, entertainment and/or sports facilities parking lots, and any other location which would be of interest to a vehicle operator and/or occupant. The database 65 can be updated by updates obtained from any of the central processing computers 20, from a main central processing computer (not shown), or from any of the location computers 40 which are utilized with the present invention. The updates can be obtained on, or over, the Internet and/or the World Wide Web.

The names and location data pertaining to the video camera locations, along with the URLs for the respective location computers 40, along with links therefor, are also stored in the database 65. The above information can be correlated with vehicle location data which is obtained by the global positioning device 50 of the respective vehicle computer 10 which global positioning data can be transmitted to the central processing computer 20. The central processing computer 20 may transmit data and/or information concerning the locations of cameras 40 to any of the vehicle computers 10. In this manner, a vehicle operator and/or occupant may be advised of camera locations in their vicinity, in or along their travel route, or of other interest to the vehicle operator or occupant.

If the global positioning device 50 determines vehicle position, or if vehicle position information is manually entered by the vehicle operator or occupant, the position information can be transmitted to the central processing computer 20 and correlated with the data and/or information stored in the database 65 so as to provide the vehicle operator and/or occupant with a selection of locations which he or she may access to obtain video or other information.

As noted herein, the present invention provides information pertaining to traffic and other conditions on roadways, at entrances and exits to roadways, on highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and arenas and at entertainment facilities and centers.

In the preferred embodiment, the database 65 stores the uniform resource locators (URLs) for any number of location computers 40 which are associated with the various locations of the video cameras 30. The URL data for each camera may be cross referenced with geographical data of each video camera 30 so that the position and/or location data obtained by the global positioning device 50 can be utilized so as to identify all of the locations and URLs for the associated location computers 40 in the vehicle's region or area of travel.

The URL information is continuously updated and is available at the central processing computers 20 and/or the vehicle computer 10 so that the vehicle operator and/or occupant may have access to the respective locations as the vehicle travels. URL updates from the central processing computers 20 and from the location computers 40 can also be obtained by the vehicle computer 10. In this manner, the present invention provides continuous location information to a vehicle operator or occupant, which information can be utilized to obtain information regarding a location or a group of locations.

The database 65 also contains location data or information, which includes the latitude and longitude for any of the locations along roadways, highways, expressways, parkways, and/or exits, overpasses, or other points of interest along same, bridges, tunnels, toll booths or toll booth plazas, or destinations of interest, etc.

The database 65 also contains travel route data or information between locations and/or between locations and destinations. Locations data or information for cameras along a given route or given routes can be linked utilizing database management techniques in or to provide data or information along or for a given travel route. The database 65 also contains location data and information for any of the various cameras 30.

In any of the embodiments described herein, any location data or information may include latitude and longitude data or information and/or any other suitable data or information for identifying a given location.

In any of the embodiments described herein, the data and/or information stored in the database 65 may be obtained via data or information which is pre-stored in same, data or information which is loaded into the central processing computer 20 from a storage medium such as a floppy disk, a diskette, a compact disk, or a digital video disk, or via any other storage medium, or data or information which is downloaded from any other central processing computer(s) 20 which are utilized in conjunction with the present invention. The central processing computer 20, in order to accommodate data and information loading, may include a respective floppy disk drive, diskette drive, compact disk drive, or digital video disk drive.

The database 65 can be updated by updates obtained from any of the central processing computers 20 and/or the location computers 40 which are utilized with the present invention. The updates can be obtained on, or over, the Internet and/or the World Wide Web.

Although the Internet and/or the World Wide Web is the preferred communication system and/or medium utilized, it is important to note that communication between any one of the location computers 40, the central processing computers 20, and the vehicle computers 10, can be provided over any suitable communication system including, but not limited to network communication systems, telephone communication systems, cellular communication systems, digital communication systems, personal communication systems, personal communication services (PCS) systems, satellite communication systems, broad band communication systems, low earth orbiting (LEO) satellite systems and line telephone systems.

Each of the video cameras 30, in the preferred embodiment of the invention, are designed for use outdoors so that they will be unaffected by the environment and/or the elements. A manual and/or an automatic lenses clearing and/or cleaning device is employed, in the preferred embodiment, so as to maintain the lenses of the video cameras 30, and so as to ensure that they are cleaned for continuous use.

Each of the video cameras 30, in the preferred embodiment, have wide angle lenses for maximum viewing capabilities. The video cameras 30, depending upon its desired usage, may be moveable, rotatable and/or pivotable. Movement, rotation, and/or pivoting, of the video cameras 30 may be controlled by the central processing computer(s) 20, or by the location computer 30, corresponding thereto.

Each of the video cameras 30, in the preferred embodiment, is stationed and/or located at, on, near, or at locations for viewing, roadways, entrances and exits to roadways, highways, expressways, or parkways, and entrances to, and exits from, same, bridges, entrances to, and exits from, bridges, tunnels, inside tunnels, entrances to, and exits from, tunnels, toll booths, entrances to toll booth plazas, parking lots, shopping malls, stores, beaches, sports facilities and arenas and entertainment facilities and centers. Although each of the video cameras 30 may be turned on or off, in the preferred embodiment, the video cameras 30 are in operation 24 hours a day, seven days a week so as to provide continuous surveillance of the locations to which they are assigned.

The video cameras 30, in the preferred embodiment, are stationed on poles, road signs, buildings, overpasses, walls and other appropriate structures adjacent to, on, or at a location for viewing, roadways, highways, expressways, bridges and tunnels, and parking lots. The video cameras 30 can also be stationed along roadways, highways, expressways, along bridges and tunnels, and parking lots, at any desired intervals. For example, a video camera 30 can be stationed at a location for viewing the entrance and/or exit ramps, at mile or other distance markers and on signs, on or near any of the above described roadways, highways, expressways, bridges, tunnels, along roadways, bridges and tunnels, parking lots, and in various locations adjacent to, near, or at a location for viewing, same.

In the preferred embodiment, a plurality of vehicle computers 10 may be utilized in conjunction with the present invention so that the present invention can be utilized to provide information to a large number of vehicles and to their operators and/or occupants.

The present invention, in the preferred embodiment, also includes a plurality of central processing computers 20 which, in the preferred embodiment, are server computers each of which may be linked with a pre-defined number of location computers 40 and associated video cameras 30, which are assigned to provide service to a pre-defined geographic and/or regional area. In this manner, the present invention may be utilized to provide information and coverage to a very large geographic area. In the preferred embodiment, the present invention can be utilized to provide information and coverage internationally.

As noted above, the present invention is utilized on or over the Internet and/or the World Wide Web. In this regard, the present invention utilizes TCP/IP protocol. Applicant hereby incorporates by reference herein those known systems, devices and techniques for providing live and/or recorded information over a communication network and, in particular, on, or over, the Internet and/or the World Wide Web.

The present invention, as described above, provides information pertaining to traffic and other conditions on roadways, at entrances and exits to roadways, on highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and arenas and at entertainment facilities and centers.

Figure 4:
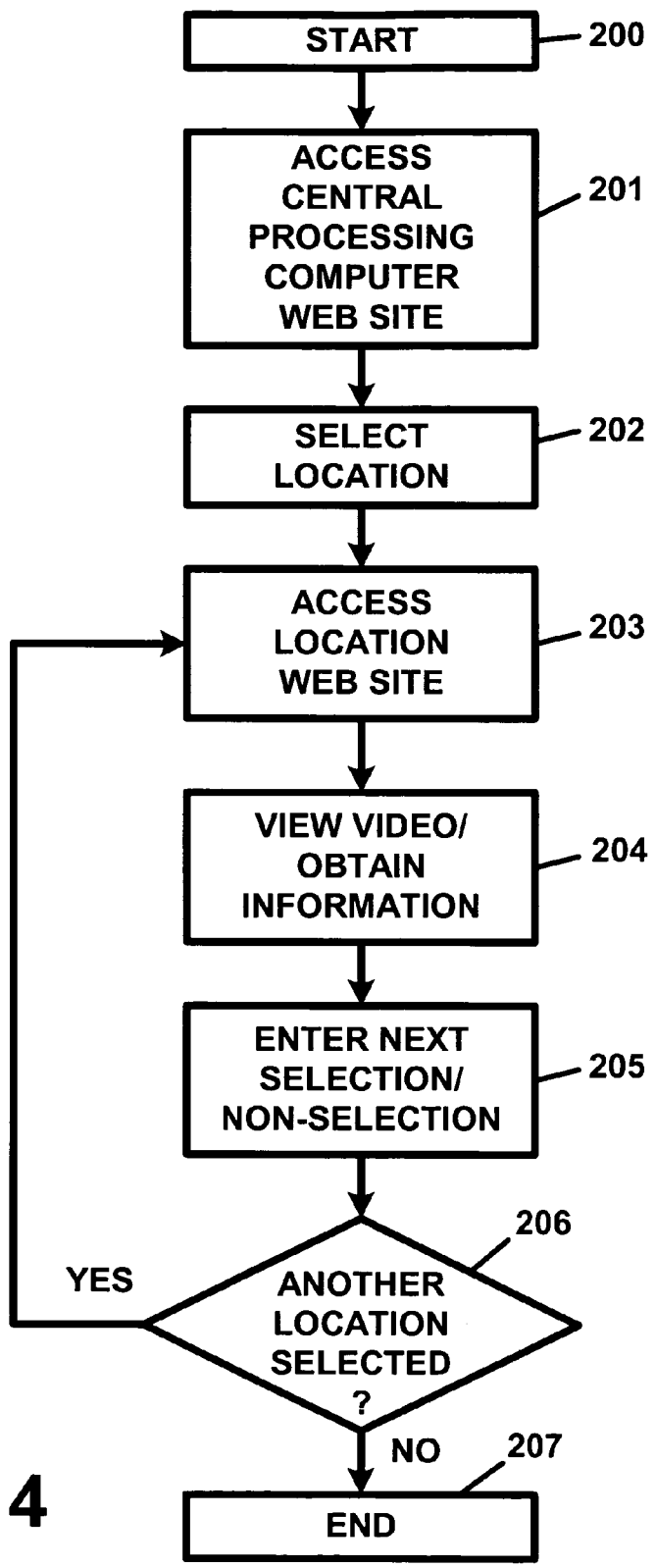
FIG. 4 illustrates a flow chart diagram of the operation of the apparatus of FIG. 1.

FIG. 4 illustrates a flow diagram of the operation of the apparatus 100 and method of the present invention. The apparatus 100, in the preferred embodiment, is utilized in the following manner. With reference to FIG. 4, the operation of the apparatus 100 commences, at step 200, upon activation by the vehicle operator and/or occupant. At step 201, the vehicle operator or occupant will access the web site associated with the central processing computer(s) 20 which services the region in which information is requested. The vehicle operator or occupant may also simply access the central processing computer(s) 20 in an embodiment in which no web site is utilized. The vehicle operator or occupant accesses the central processing computer(s) 20, or the web site associated with same, via the vehicle computer 10.

The vehicle operator or occupant may access the central processing computer 20 and/or the associated web site directly or, if the central processing computer or the web site associated therewith is not known, the vehicle operator or occupant may utilize vehicle location data obtained from the global positioning device 50 and the data stored in the database 60 in order to identify the central processing computer 20 and/or its associated web site. The position data may be cross correlated with the data stored in the database 60 in order to identify the appropriate central processing computer 20, the web site associated therewith, the appropriate location computers 40 in the region, and the web sites associated therewith.

At step 202, the vehicle operator or occupant then selects the location of the selected roadway, highway, expressway, parkway, bridge, tunnel, toll booth, toll booth plaza, parking lot, shopping mall, store, beach, sports facility or arena, or entertainment facility or center (hereinafter referred to as "location"), which the vehicle operator or occupant wants to obtain video and/or other information about. The vehicle operator or occupant selects the location by entering information via the input device 16. At step 202, the operator or occupant will select the location by selecting the uniform resource locator (URL) for the web site of the location computer 40 associated with the selected location.

At step 203, the vehicle computer 10 will access the web site of the location computer 40 for the selected location. At step 204, the vehicle operator or occupant can view the video information pertaining to the selected location via the web site of the selected location computer 40. The video information, as well as other information, is obtained via the display device 17 of the vehicle computer 10. Audio information can also be obtained from an audio device (not shown) which is also a component of the vehicle computer 10.

The vehicle operator or occupant, at step 204, can obtain other information pertinent to the selected location, which other information can include text information or audio information, which audio information is obtained from the audio device (not shown). Other information and reports can include, among other things, information regarding traffic conditions, weather conditions, forecasted traffic conditions, forecasted weather conditions, and any other useful information or news regarding the selected location which may be of interest to the vehicle operator or occupant. Any of the above information, including the video information, can be provided continuously to the vehicle operator or occupant for as long as the vehicle operator or occupant desires to obtain this information from the selected location.

News and/or maintenance services may also provide their respective services and/or information to the vehicle operator or occupant via the web site of the selected location computer 40. In this manner, a news reporting service or maintenance service may provide information, either continuously, and/or at intervals, which is pertinent to the location or which may be of interest to the vehicle operator or occupant.

At step 205, the operator or occupant may select another location to access or decide not to access any further information. At step 206, the vehicle computer 10 will determine if another location was selected by the vehicle operator or occupant. If no other location was selected, the operation of the apparatus 100 will cease at step 207 and the apparatus 100 will await the next activation by the vehicle operator and/or occupant. If, at step 206, it is determined that the vehicle operator or occupant desires to view or obtain information about another location, the operation of the apparatus 100 will return to step 202 and apparatus operation will continue.

As noted above, the information, which is provided by the present invention, can be utilized in assisting a vehicle operator and/or occupant to determine and/or find the most optimal or the least congested route to their destination. For example, a driver headed to a destination may utilize the present invention in order to view the traffic conditions on several alternate roadways or at bridges, tunnels or toll booths along the way. The driver may then utilize the information obtained in order to travel the least congested route.

Figure 5:
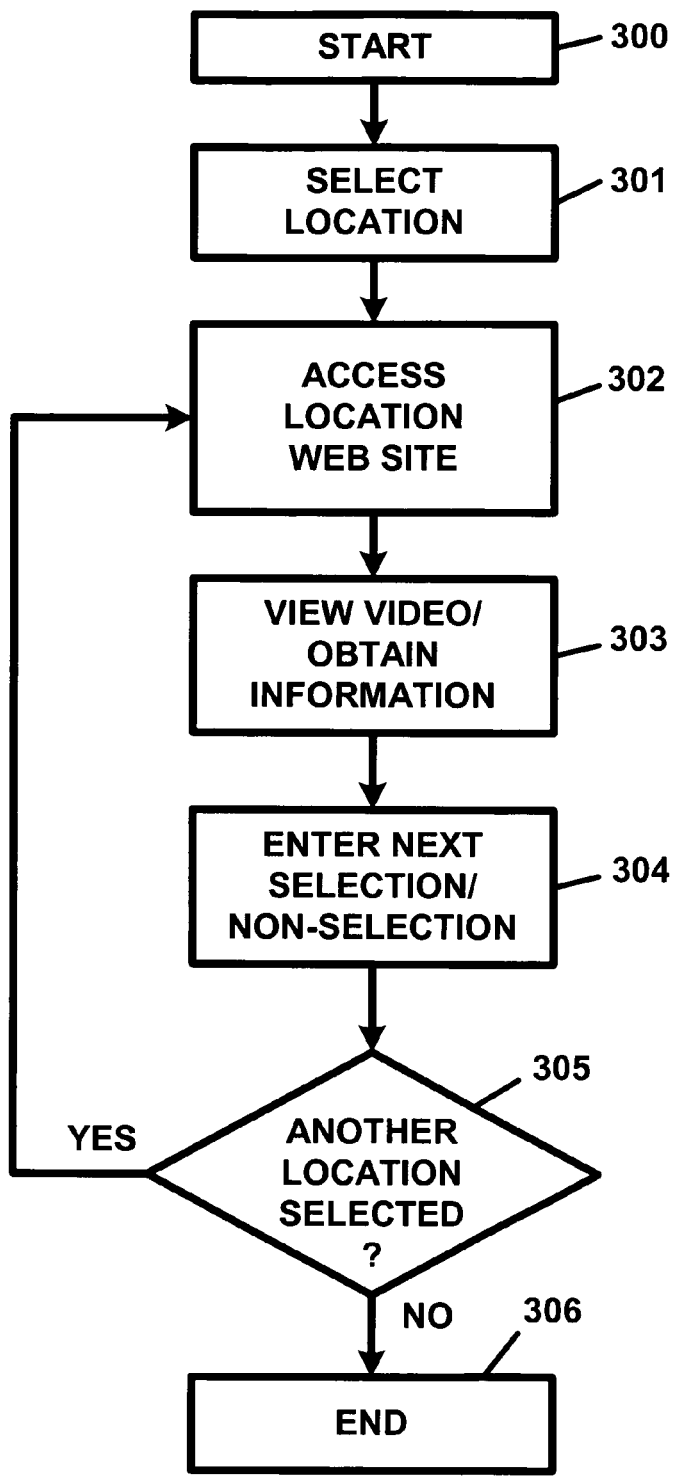
FIG. 5 illustrates a flow chart of an alternate embodiment operation of the apparatus of the present invention.

FIG. 5 illustrates a flow chart of an another preferred embodiment operation of the apparatus 100 of the present invention. With reference to FIG. 5, the operation of the apparatus 100 commences, at step 300, upon activation by the vehicle operator and/or occupant. At step 301, the vehicle operator or occupant selects the location of the selected roadway, highway, expressway, parkway, bridge, tunnel, toll booth, toll booth plaza, parking lot, shopping mall, store, beach, sports facility or arena, or entertainment facility or center (hereinafter referred to as "location"), which the vehicle operator or occupant wants to obtain video and/or other information about. The vehicle operator or occupant selects the location by entering information via the input device 16. At step 301, the operator or occupant will select the location by selecting the URL for the web site of the location computer 40 associated with the selected location.

At step 302, the vehicle computer 10 will access the web site of the location computer 40 for the selected location. At step 303, the vehicle operator or occupant can view the video information pertaining to the selected location via the web site of the selected location computer 40. The video information, as well as other information, is obtained via the display device 17 of the vehicle computer 10. The vehicle operator or occupant, at step 303, can obtain other information pertinent to the selected location, which other information can include text information or audio information, which audio information is obtained from the audio device (not shown).

As with the embodiment of FIG. 4, the other information and reports can include, among other things, information regarding traffic conditions, weather conditions, forecasted traffic conditions, forecasted weather conditions, and any other useful information regarding the selected location which may be of interest to the vehicle operator or occupant. Any of the above information, including the video information, can be provided continuously to the vehicle operator or occupant for as long as the vehicle operator or occupant desires to obtain the information from the selected location.

News and/or maintenance services may also provide information to the vehicle operator or occupant via the web site of the selected location computer 40. In this manner, a news reporting service or maintenance service may provide information, either continuously, and/or at intervals, which is pertinent to the location.

At step 304, the operator or occupant may select another location to access or decide not to access any further information. At step 305, the vehicle computer 10 will determine if another location was selected by the vehicle operator or occupant. If no other location was selected, the operation of the apparatus 100 will cease at step 306 and the apparatus 100 will await the next activation by the vehicle operator and/or occupant. If, at step 305, it is determined that the vehicle operator or occupant desires to view or obtain information about another location, the operation of the apparatus 100 will return to step 302 and apparatus operation will continue.

It is important to note that while the vehicle computer 10 could communicate directly with each of the location computers 40 and/or their web sites, the utilization of the central processing computer(s) 20 and its/their associated web site(s) may be desired as a means by which to provide a link with a number of location computers 40 for purposes of convenience. The utilization of a central processing computer 20 also provides a means by which to access numerous locations in different regions and/or geographic areas.

Figure 6:
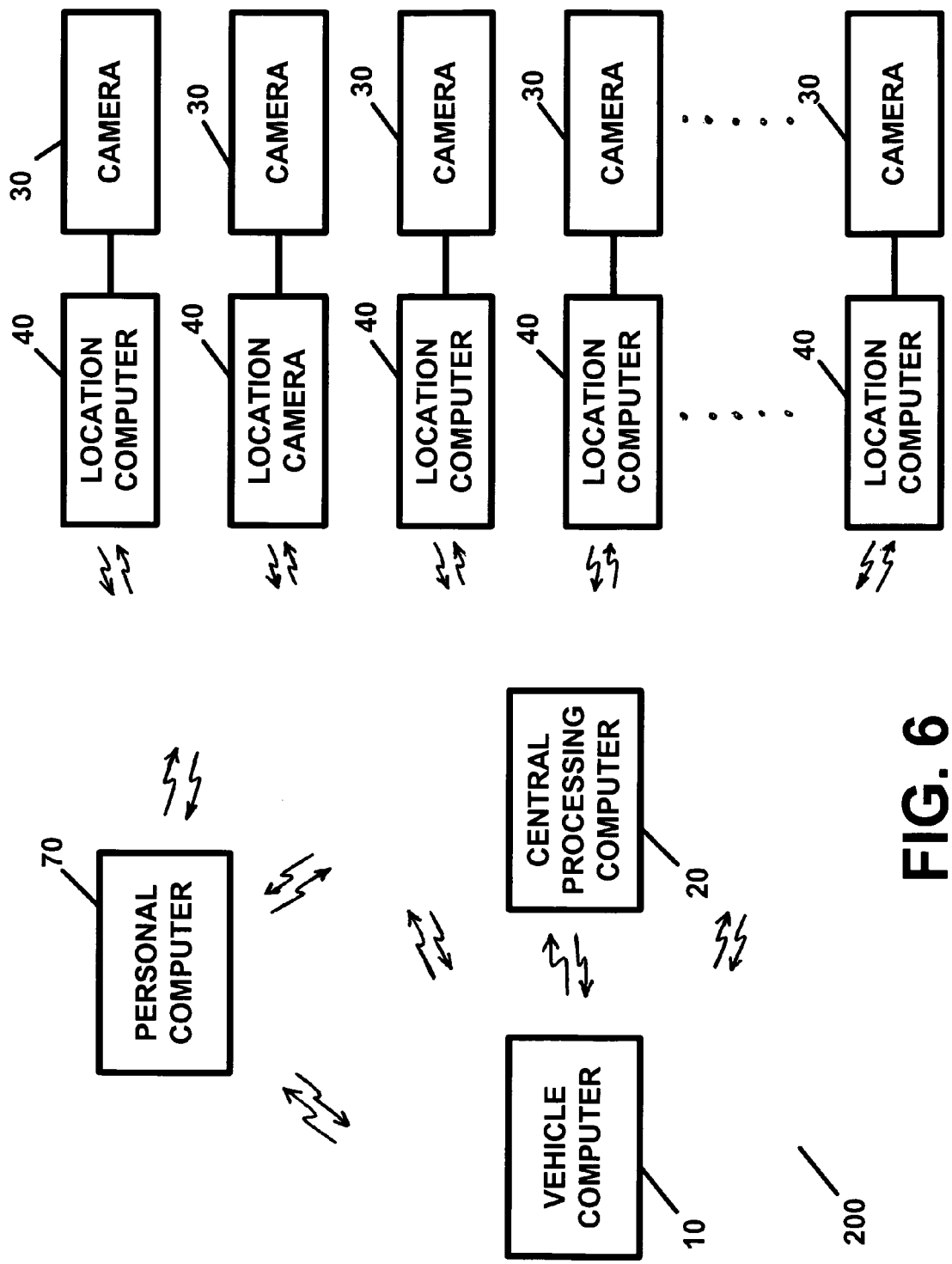
FIG. 6 illustrates another preferred embodiment of the present invention.

In an alternate embodiment, the present invention may be utilized to provide all of the information described herein, regarding the above-described locations, to a user of a home or personal computer including a laptop computer. FIG. 6 illustrates an alternate embodiment of the apparatus of the present invention. In FIG. 6, the apparatus, which is designated by the reference numeral 200, includes a personal computer 70. The user of the personal computer may utilize the apparatus and method of the present invention, in the manner described herein so as to obtain any and all of the herein-described location information via the personal computer 70.

The personal computer 70 can communicate with the vehicle computer 10 so that the personal computer 70 can be utilized to exercise control over the vehicle computer 10 and so as to obtain data and information therefrom. Vehicle position data may be obtained from the global positioning device 50 via the vehicle computer 10 and be utilized by the personal computer 70 so as to determine the location of the vehicle and the location or link information needed to access the central processing computer(s) 20 in the geographic region or area in which the vehicle is located. Location and link information for all of the location computers 40 in the geographic region or area can also be provided to the personal computer 70.

The personal computer 70 can also communicate with any one of the central processing computers 20 and with any one or all of the location computers 40 which are utilized with the apparatus of the present invention.

The personal computer 70 may be any one or more of a home computer, a laptop computer, a handheld computer, a palmtop computer, a television, an interactive television, a digital television, a personal digital assistant, a telephone, a digital telephone, a personal communication device, and a personal communications services device. In this manner, information about any of the herein-described locations can be available to a user at, or from, any location.

In any or all of the embodiments described herein, the vehicle computer 10 may access, and obtain data and/or information directly from the central processing computer(s) 20 which services the region and/or directly from any of the location computers 40. It is also understood that any of the location computers 40 can be accessed via a respective central processing computer(s) 20.

In another preferred embodiment, the vehicle computer 10 includes a microphone (not shown) which, along with associated voice recognition software, allows the vehicle operator or occupant to operate and/or interact with the vehicle computer 10 in a hands-free mode. The vehicle computer 10 can also include a speaker (not shown) for providing audio information regarding vehicle computer operation, information regarding roadways, highways, parkways, expressways, bridges, tunnels, tolls, and/or regarding any other herein-described information which can be of interest to the vehicle operator or occupant. In this manner, the vehicle computer 10 can provide information to the vehicle operator or occupant without requiring the vehicle operator or occupant to have to look at the monitor, video screen, or display device of the vehicle computer 10.

In any of the preferred embodiments described herein, vehicle location data may be entered and/or updated manually by the vehicle operator or occupant such as by selecting location or position information from a menu selection. The selected location will have correlated therewith its latitude and longitude data as well as any other suitable position or location data or information. Vehicle location data can also be entered and/or updated automatically by the global positioning device 50. The entered or updated data may then be processed by the vehicle computer 10 or transmitted to, and processed by, the respective central processing computer(s) 20.

In another preferred embodiment, the apparatus 100 can provide continuous updates of the travel route up ahead. In this embodiment, the vehicle computer 10, having the current vehicle location data or information and destination data or information, can provide automatic sequencing of the video information obtained from the various cameras 30 along the planned travel route. For example, in travel from location A to location Z, the vehicle computer 10, will ascertain, from travel route information stored in the database 60, that locations or points A through Y are located along the planned travel route. The vehicle computer 10 can then sequentially present, to the vehicle operator or occupant, the video information and/or other information obtained by the respective cameras 30 for each of respective locations or points B through Z along the travel route.

The video image presented for each location or point may be timed so as to allow the vehicle operator or occupant adequate time to see it. The vehicle computer 10 can also be programmed to continuously play and replay the travel route video or other information. Video or other information display or presentation time, along with continuous replays, can be selected and/or programmed by the vehicle operator or occupant.

The vehicle computer 10 is also programmed to detect change in travel route or a departure from a previous route. If the vehicle computer 10 detects a change in a travel route or a departure from a previous route, the vehicle computer 10 will prompt the vehicle operator or occupant for information as to whether a new destination is intended and re-compute a new travel route from the data or information stored in the database 60.

If the same destination is intended, the vehicle computer 10 will revise the travel route. Change in travel or departure from a previous route may be detected by the manual entry of new location data or new destination data, and/or by the location data obtained from the global positioning device 50. The global positioning device 50, in any of the embodiments described herein, may be operate continuously and/or at any other time or time interval.

In another preferred embodiment, the central processing computer(s) 20 may perform the same functions described above, in the case of the vehicle computer 10, by obtaining vehicle location and destination data from the vehicle computer 10, by processing same in the exact manner described above in the case of the vehicle computer 10, and by transmitting the video and other information for the various locations or points to the vehicle computer 10.

In any of the preferred embodiments described herein, vehicle location data may be entered and/or updated manually by the vehicle operator or occupant such as by selecting location or position information from a menu selection. The selected location will have correlated therewith its latitude and longitude data as well as any other suitable position or location data or information. Vehicle location data can also be entered and/or updated automatically by the global positioning device 50. The entered or updated data may then be processed by the vehicle computer 10 or transmitted to, and processed by, the respective central processing computer(s) 20.

In this embodiment, the central processing computer 20, having the current vehicle location data or information and destination data or information, can provide automatic sequencing of the video information obtained from the various cameras 30 along the planned travel route. For example, in travel from location A to location Z, the central processing computer 20 will ascertain, from travel route information stored in the database 65, that locations or points A through Y are located along the planned travel route. The central processing computer 20 can then sequentially present and transmit to the vehicle computer 10 and the vehicle operator or occupant, the video information and/or other information obtained by the respective cameras 30 for each of the respective locations or points along the travel route.

As in the previously described embodiment, the video image presented for each location or point may be timed so as to allow the vehicle operator or occupant adequate time to see it. The central processing computer can also be programmed to continuously play and replay the travel route video or other information. Video or other information display or presentation time, along with whether continuous replays, can be selected and/or programmed by the vehicle operator or occupant via the vehicle computer 10.

The central processing computer 20 is also programmed to detect change in travel route or a departure from a previous route. If the central processing computer 20 detects a change in a travel route or a departure from a previous route, the central processing computer 20 will prompt the vehicle operator or occupant for information as to whether a new destination is intended and re-compute a new travel route from the data or information stored in the database 65.

If the same destination is intended, the central processing computer 20 will revise the travel route. Change in travel or departure from a previous route may be detected by the manual entry of new location data or new destination data, and/or by the location data obtained from the global positioning device 50 or the vehicle computer 10. The global positioning device 50, in any of the embodiments described herein, may be operate continuously and/or at any other time or time interval.

In this manner, the apparatus and method of the present invention can provide video and other information about a travel route or location or point along, or on, a travel route, in real-time.

In another preferred embodiment, an individual can preview the travel route for an anticipated or planned travel route via the personal computer 70, such as from home or from the office or from any other place. The individual may also preview the travel route via the vehicle computer 10 prior to embarking on his journey or before leaving his driveway.

The present invention provides real-time traffic conditions, road conditions and weather conditions and provides valuable information to any traveler.

The present invention may be utilized, in all of the herein-described embodiments, in conjunction with vehicles of any type, including automobiles, recreational vehicles, motor-cycles, motor homes, mobile homes, commercial vehicles, commercial equipment, marine vehicles, marine vessels, boats, aircraft, airplanes, jets, helicopters and any other vehicle of piece of equipment. In this manner, an operator or occupant of the vehicle or piece of equipment may benefit from the utilization of the apparatus and method of the present invention.

The present invention describes an apparatus and a method for providing the above-described information about the above-described locations so as the provide a vehicle operator and/or occupant with valuable information concerning the roadways, bridges, tunnels, toll booths and/or parking lots, as well as other locations, which would enable the vehicle operator and/or occupant to make informed driving and/or traveling decisions. For example, a vehicle operator traveling to a given destination, may wish to view various locations along the way to minimize driving and/or traveling time and/or effort.

By utilizing the apparatus and method of the present invention, the vehicle operator may view roadways, bridges, tunnels, toll booths, and other entities along the way, so as to select the route with the least traffic, congestion or delays. Further, the apparatus and method of the present invention provides an embodiment for allowing a user of a home or personal computer to obtain the same information from his or her home or other location so as to more carefully plan out his or her trip beforehand. As noted above, the present invention can be utilized to provide information and coverage internationally.

While the present invention has been described and illustrated in various embodiments, such description and illustrations are merely illustrative of the present invention and are not to be construed to be limitations thereof. Accordingly, the present invention encompasses any and all modifications, variations, and/or alternate embodiments, with the scope of the present invention being limited only by the claims which follow.

What is claimed is:

1. An apparatus, comprising:
  a receiver, wherein the receiver receives a request for information regarding a first travel route and a second travel route, wherein the request for information is transmitted to the receiver from a vehicle computer located at a vehicle, and further wherein the request for information contains information regarding a location of the vehicle and a destination to which the vehicle can travel on at least one of a road, a roadway, a highway, a parkway, and an expressway;

a processing device, wherein the processing device processes the request for information, wherein the processing device determines a first travel route along or on a first at least one of a road, a roadway, a highway, a parkway, and an expressway, on which first travel route the vehicle can travel to the destination, and further wherein the processing device determines a second travel route to the destination on a second at least one of a road, a roadway, a highway, a parkway, and an expressway, on which second travel route the vehicle can travel to the destination, and further wherein the processing device identifies a first plurality of video cameras associated with the first travel route and identifies a second plurality of video cameras associated with the second travel route, wherein each video camera of the first plurality of video cameras associated with the first travel route and each video camera of the second plurality of video cameras associated with the second travel route is assigned to a location at least one of along, on, adjacent to, and near, the first travel route or the second travel route, and further wherein the apparatus receives video information from at least one video camera of the first plurality of video cameras and receives video information from at least one video camera of the second plurality of video cameras; and a transmitter, wherein the transmitter transmits the video information obtained from the at least one video camera of the first plurality of video cameras to the vehicle computer, and further wherein the transmitter transmits the video information obtained from the at least one video camera of the second plurality of video cameras to the vehicle computer.

2. The apparatus of claim 1, further comprising:
a database, wherein the database stores information regarding the first travel route and the second travel route, location information for at least one video camera of the first plurality of video cameras and the second plurality of video cameras, information regarding a link associated with at least one video camera of the first plurality of video cameras and the second plurality of video cameras, and information regarding at least one of a roadway, a highway, an expressway, a parkway, an entrance to or exit from at least one of a roadway, a highway, an expressway, a parkway, a bridge, a tunnel, a toll booth, a toll booth plaza, an entrance to or exit from at least one of a bridge, a tunnel, a toll booth, a toll booth plaza, and a parking lot for at least one of a shopping mall, a store, a beach, a sports facility, an arena, and an entertainment facility or center.

3. The apparatus of claim 1, wherein the video information obtained from each video camera of the first plurality of video cameras and the video information obtained from each video camera of the second plurality of video cameras is transmitted to the vehicle computer in a sequential manner.

4. The apparatus of claim 1, wherein video information regarding a plurality of locations is transmitted to the vehicle computer for simultaneous viewing via the vehicle computer.

5. The apparatus of claim 1, wherein at least one video camera of the first plurality of video cameras or at least one video camera of the second plurality of video cameras, is located at a location for viewing at least one of a roadway, an entrance to a roadway, an exit from a roadway, a bridge, a bridge entrance, a bridge exit, a tunnel, an inside of a tunnel, a tunnel entrance, a tunnel exit, a toll booth, an entrance to a toll booth plaza, and a parking lot.

6. The apparatus of claim 1, wherein the apparatus transmits at least one of information regarding a traffic condition, a traffic forecast, a forecasted traffic condition, a weather condition, a forecasted weather condition, weather information, a weather forecast, maintenance information, and a news report.

7. The apparatus of claim 1, wherein the apparatus controls at least one of a movement, a rotation, and a pivoting, of at least one video camera of the first plurality of video cameras or at least one video camera of the second plurality of video cameras.

8. The apparatus of claim 1, wherein at least one video camera of the first plurality of video cameras or at least one video camera of the second plurality of video cameras is at least one of stationed on at least one of a pole, a road sign, a building, an overpass, and a wall or structure, adjacent to or at a location for viewing at least one of a roadway, a highway, an expressway, a bridge, a tunnel, and a parking lot, and stationed along at least one of a roadway, a highway, an expressway, a bridge, a tunnel, and a parking lot.

9. The apparatus of claim 1, wherein the vehicle is at least one of an automobile, a recreational vehicle, a motorcycle, a motor home, a mobile home, a commercial land vehicle, and a commercial equipment.

10. An apparatus, comprising:
an input device, wherein the input device inputs information regarding at least one of a location of a vehicle and a destination to which the vehicle can travel on at least one of a road, a roadway, a highway, a parkway, and an expressway, wherein the input device is located at the vehicle;

a processing device, wherein the processing device processes information input via the input device, wherein the processing device determines a first travel route along or on a first at least one of a road, a roadway, a highway, a parkway, and an expressway, on which first travel route the vehicle can travel to the destination, and further wherein the processing device determines a second travel route to the destination on a second at least one of a road, a roadway, a highway, a parkway, and an expressway, on which second travel route the vehicle can travel to the destination, and further wherein the processing device identifies a first plurality of video cameras associated with the first travel route and identifies a second plurality of video cameras associated with the second travel route, wherein each video camera of the first plurality of video cameras associated with the first travel route and each video camera of the second plurality of video cameras associated with the second travel route is assigned to a location at least one of along, on, adjacent to, and near, the first travel route or the second travel route;

a receiver, wherein the receiver receives video information obtained from each video camera of the first plurality of video cameras and receives video information from each video camera of the second plurality of video cameras; and a display device, wherein the display device displays the video information obtained from at least one video camera of the first plurality of video cameras and displays the video information obtained from at least one video camera of the second plurality of video cameras, wherein the display device is located at the vehicle.

11. The apparatus of claim 10, further comprising:
a global positioning device, wherein the global positioning device determines a position or a location of the vehicle.

12. The apparatus of claim 10, wherein at least one of the input device and the display device is located at least one of on, in, and adjacent to, a dashboard of the vehicle or a console of the vehicle.

13. The apparatus of claim 10, further comprising:
a head-up display device, wherein the head-up display device provides information on a windshield of the vehicle.

14. The apparatus of claim 10, wherein the apparatus is programmed to provide video information for a location up ahead on the first travel route or up ahead on the second travel route.

15. The apparatus of claim 10, wherein the display device displays a plurality of video images simultaneously.

16. The apparatus of claim 10, further comprising:
a speaker, wherein the speaker provides audio information.

17. The apparatus of claim 10, further comprising:
a database, wherein the database stores at least one of information regarding the first travel route and the second travel route, location information for at least one video camera of the first plurality of video cameras and the second plurality of video cameras, information regarding a link associated with at least one video camera of the first plurality of video cameras and the second plurality of video cameras, and information regarding at least one of a roadway, a highway, an expressway, a parkway, an entrance to or exit from at least one of a roadway, a highway, an expressway, a parkway, a bridge, a tunnel, a toll booth, a toll booth plaza, an entrance to or exit from at least one of a bridge, a tunnel, a toll booth, a toll booth plaza, and a parking lot for at least one of a shopping mall, a store, a beach, a sports facility, an arena, and an entertainment facility or center.

18. The apparatus of claim 10, wherein the video information from each video camera of the first plurality of video cameras, and the video information obtained from each video camera of the second plurality of video cameras, is displayed on the display device in a sequential manner.

19. The apparatus of claim 10, wherein at least one video camera of the first plurality of video cameras or at least one video camera of the second plurality of video cameras, is located at a location for viewing at least one of a roadway, an entrance to a roadway, an exit from a roadway, a bridge, a bridge entrance, a bridge exit, a tunnel, an inside of a tunnel, a tunnel entrance, a tunnel exit, a toll booth, an entrance to a toll booth plaza, and a parking lot.

20. The apparatus of claim 10, wherein the apparatus receives at least one of information regarding a traffic condition, a traffic forecast, a forecasted traffic condition, a weather condition, a forecasted weather condition, weather information, a weather forecast, maintenance information, and a news report.

21. The apparatus of claim 10, wherein at least one video camera of the first plurality of video cameras or at least one video camera of the second plurality of video cameras is at least one of stationed on at least one of a pole, a road sign, a building, an overpass, and a wall or structure, adjacent to or at a location for viewing at least one of a roadway, a highway, an expressway, a bridge, a tunnel, and a parking lot, and stationed along at least one of a roadway, a highway, an expressway, a bridge, a tunnel, and a parking lot.

22. An apparatus, comprising:
an input device, wherein the input device inputs information regarding at least one of a location of a vehicle and a destination to which the vehicle can travel on at least one of a road, a roadway, a highway, a parkway, and an expressway, wherein the apparatus is located at the vehicle;

a first processing device, wherein the first processing device processes information input via the input device, wherein the first processing device generates a travel route information request for information regarding a travel route on at least one of a road, a roadway, a highway, a parkway, and an expressway, on which travel route the vehicle can travel to the destination;

a transmitter, wherein the transmitter transmits the travel route information request to a second processing device located remote from the vehicle;

a receiver, wherein the receiver receives information regarding a travel route on at least one of a road, a roadway, a highway, a parkway, and an expressway, on which travel route the vehicle can travel to the destination from the second processing device, wherein the second processing device determines or identifies a first travel route on a first at least one of a road, a roadway, a highway, a parkway, and an expressway, on which first travel route the vehicle can travel to the destination, and further wherein the second processing device determines or identifies a second travel route on a second at least one of a road, a roadway, a highway, a parkway, and an expressway, on which second travel route the vehicle can travel to the destination, and further wherein the information regarding a travel route contains video information obtained from a first plurality of video cameras associated with the first travel route and contains video information obtained from a second plurality of video cameras associated with the second travel route, and further wherein each video camera of the first plurality of video cameras is assigned to a location at least one of along, on, adjacent to, and near, the first travel route and each video camera of the second plurality of video cameras is assigned to a location at least one of along, on, adjacent to, and near, the second travel route; and a display device, wherein the display device displays the video information obtained from each video camera of the first plurality of video cameras and for displaying the video information obtained from each video camera of the second plurality of video cameras, wherein the video information obtained from each video camera of the first plurality of video cameras and the video information obtained from each video camera of the second plurality of video cameras is displayed on the display device in a sequential manner.

23. An apparatus, comprising:
a receiver, wherein the receiver receives a request for information regarding a travel route to a destination to which the vehicle can travel on at least one of a road, a roadway, a highway, a parkway, and an expressway, wherein the request for information is transmitted to the receiver from a communication device located at the vehicle, wherein the request for information contains information regarding a location of the vehicle and the destination;

a processing device, wherein the processing device processes the request for information, wherein the processing device identifies a first travel route on which the vehicle can travel to the destination, and further wherein the processing device generates a first message containing information regarding the first travel route; and a transmitter, wherein the transmitter transmits the first message to the communication device, wherein the apparatus automatically detects a departure of the vehicle from the first travel route, and further wherein the apparatus identifies a second travel route on which the vehicle can travel to the destination in response to the detected departure of the vehicle from the first travel route, wherein the apparatus generates a second message containing information regarding the second travel route, and further wherein the apparatus transmits the second message to the communication device.

24. The apparatus of claim 23, wherein the communication device is at least one of a computer, a laptop computer, a handheld computer, a palmtop computer, a television, an interactive television, a digital television, a personal digital assistant, a telephone, a digital telephone, a personal communication device, and a personal communications services device.

25. The apparatus of claim 1, wherein the apparatus is programmed to automatically detect a departure of the vehicle from the first travel route or from the second travel route, and further wherein the processing device identifies a third travel route in response to detecting the departure of the vehicle from the first travel route or the second travel route, wherein the apparatus obtains video information from at least one video camera of a third plurality of video cameras associated with the third travel route, and further wherein the transmitter transmits the video information obtained from the at least one video camera of the third plurality of video cameras associated with the third travel route to the vehicle computer.

26. The apparatus of claim 1, wherein the apparatus transmits video information, text information, or audio information, regarding a traffic condition or traffic information regarding or associated with the first travel route or the second travel route to the vehicle computer.

27. The apparatus of claim 1, wherein the apparatus transmits text information or audio information regarding a traffic forecast associated with the first travel route or the second travel route to the vehicle computer.

28. The apparatus of claim 1, wherein the apparatus transmits text information or audio information regarding a weather condition, weather information, or a forecasted weather condition or a weather forecast, on or associated with the first travel route or the second travel route, to the vehicle computer.

29. The apparatus of claim 1, wherein the apparatus transmits text information or audio information regarding maintenance information associated with the first travel route or the second travel route, to the vehicle computer.

30. The apparatus of claim 1, wherein the apparatus transmits text information or audio information regarding a news report to the vehicle computer.

31. The apparatus of claim 19, wherein the apparatus provides video information, text information, or audio information, regarding at least one of a traffic condition, a traffic forecast, a weather condition, weather information, and a forecasted weather condition or a weather forecast, associated with the first travel route or the second travel route, to the vehicle computer.

32. The apparatus of claim 19, wherein the apparatus provides text information or audio information regarding maintenance information associated with the first travel route or the second travel route to the vehicle computer.

33. The apparatus of claim 10, wherein the apparatus provides text information or audio information regarding a news report.

34. The apparatus of claim 10, wherein the apparatus is programmed to automatically detect a departure of the vehicle from the first travel route or from the second travel route, and further wherein the processing device identifies a third travel route in response to detecting the departure of the vehicle from first travel route or the second travel route, wherein the apparatus obtains or receives video information from at least one video camera of a third plurality of video cameras associated with the third travel route.

35. The apparatus of claim 23, wherein the first message or the second message contains text information regarding a traffic condition or traffic information on or associated with the first travel route or the second travel route.

36. The apparatus of claim 23, wherein the first message or the second message contains audio information regarding a traffic condition or traffic information on or associated with the first travel route or the second travel route.

37. The apparatus of claim 23, wherein the first message or the second message contains text information regarding a traffic forecast associated with the first travel route or the second travel route.

38. The apparatus of claim 23, wherein the first message or the second message contains audio information regarding a traffic forecast associated with the first travel route or the second travel route.

39. The apparatus of claim 23, wherein the first message or the second message contains text information regarding a weather condition or weather information on or associated with the first travel route or the second travel route.

40. The apparatus of claim 23, wherein the first message or the second message contains audio information regarding a weather condition or weather information on or associated with the first travel route or the second travel route.

41. The apparatus of claim 23, wherein the first message or the second message contains text information or audio information regarding a forecasted weather condition or a weather forecast on or associated with the first travel route or the second travel route.

42. The apparatus of claim 23, wherein the first message or the second message contains text information or audio information regarding maintenance information associated with the first travel route or the second travel route.

43. The apparatus of claim 23, wherein the first message or the second message contains text information regarding a news report.

44. The apparatus of claim 23, wherein the first message or the second message contains audio information regarding a news report.

45. The apparatus of claim 23, wherein the first message or the second message contains video information associated with the first travel route or the second travel route.

46. A method, comprising:
receiving, with a receiver, a request for information regarding a first travel route and a second travel route, wherein the request for information is transmitted from a vehicle computer located at a vehicle, and further wherein the request for information contains information regarding a location of the vehicle and a destination to which the vehicle can travel on at least one of a road, a roadway, a highway, a parkway, and an expressway;
processing, with a processing device, the request for information;
determining, with the processing device or with a computer, a first travel route along or on a first at least one of a road, a roadway, a highway, a parkway, and an expressway, on which first travel route the vehicle can travel to the destination;

determining, with the processing device or with the computer, a second travel route to the destination on a second at least one of a road, a roadway, a highway, a parkway, and an expressway, on which second travel route the vehicle can travel to the destination;

identifying, with the processing device or with the computer, a first plurality of video cameras associated with the first travel route and identifying, with the processing device or with the computer, a second plurality of video cameras associated with the second travel route, wherein each video camera of the first plurality of video cameras associated with the first travel route and each video camera of the second plurality of video cameras associated with the second travel route is assigned to a location at least one of along, on, adjacent to, and near, the first travel route or the second travel route;

receiving video information from at least one video camera of the first plurality of video cameras and receiving video information from at least one video camera of the second plurality of video cameras; and transmitting, with or via a transmitter, the video information obtained from the at least one video camera of the first plurality of video cameras to the vehicle computer, and transmitting the video information obtained from the at least one video camera of the second plurality of video cameras to the vehicle computer.

47. A method, comprising:

inputting, with an input device, information regarding at least one of a location of a vehicle and a destination to which the vehicle can travel on at least one of a road, a roadway, a highway, a parkway, and an expressway, wherein the input device is located at the vehicle;

processing, with a processing device, the information input via the input device;

determining, with the processing device or with a computer, a first travel route along or on a first at least one of a road, a roadway, a highway, a parkway, and an expressway, on which first travel route the vehicle can travel to the destination, and determining, with the processing device or with the computer, a second travel route to the destination on a second at least one of a road, a roadway, a highway, a parkway, and an expressway, on which second travel route the vehicle can travel to the destination;

identifying, with the processing device or with the computer, a first plurality of video cameras associated with the first travel route and identifying, with the processing device or with the computer, a second plurality of video cameras associated with the second travel route, wherein each video camera of the first plurality of video cameras associated with the first travel route and each video camera of the second plurality of video cameras associated with the second travel route is assigned to a location at least one of along, on, adjacent to, and near, the first travel route or the second travel route;

receiving, with a receiver, video information obtained from each video camera of the first plurality of video cameras and receiving video information from each video camera of the second plurality of video cameras; and displaying, via a display device, the video information obtained from at least one video camera of the first plurality of video cameras and displaying, via the display device, the video information obtained from at least one video camera of the second plurality of video cameras, wherein the display device is located at the vehicle.

48. A method, comprising:

receiving, with a receiver, a request for information regarding a travel route to a destination to which a vehicle can travel on at least one of a road, a roadway, a highway, a parkway, and an expressway, wherein the request for information is transmitted to the receiver from a communication device located at the vehicle, and further wherein the request for information contains information regarding a location of the vehicle or the destination;

processing, with a processing device, the request for information;

identifying, with the processing device or with a computer, a first travel route on which the vehicle can travel to the destination;

generating, with the processing device or with the computer, a first message containing information regarding the first travel route;

transmitting, with or via a transmitter, the first message to the communication device;

detecting a departure of the vehicle from the first travel route, wherein the departure of the vehicle from the first travel route is automatically detected by the processing device or by the computer;

identifying, with the processing device or with the computer, a second travel route on which the vehicle can travel to the destination in response to the detected departure of the vehicle from the first travel route;

generating, with the processing device or with the computer, a second message containing information regarding the second travel route, wherein the second message is automatically generated by the processing device or by the computer; and transmitting the second message to the communication device.

49. The method of claim 48, further comprising:

transmitting a third message to the communication device, wherein the third message contains video information regarding the first travel route or the second travel route.

50. The method of claim 49, wherein the video information is obtained with or by at least one camera located along, on, adjacent to, or near, the first travel route or the second travel route.

51. The method of claim 48, further comprising:

transmitting a third message to the communication device, wherein the third message contains text information or audio information regarding at least one of a traffic condition or traffic information on or associated with the first travel route or the second travel route.

52. The method of claim 48, further comprising:

transmitting a third message to the communication device, wherein the third message contains text information or audio information regarding a traffic forecast associated with the first travel route or the second travel route, or text information or audio information regarding maintenance information associated with the first travel route or the second travel route.

53. The method of claim 48, further comprising:

transmitting a third message to the communication device, wherein the third message contains text information or audio information regarding a weather condition, weather information, a forecasted weather condition, or a weather forecast.

54. The method of claim 48, further comprising:
transmitting a third message to the communication device, wherein the third message contains text information or audio information regarding a news report.

55. An apparatus, comprising:
a global positioning device, wherein the global positioning device determines a position or a location of a vehicle;
a processing device, wherein the processing device processes information regarding the position or the location of the vehicle and information regarding a destination to which the vehicle can travel on at least one of a road, a roadway, a highway, a parkway, and an expressway, and further wherein the processing device determines or identifies a travel route to the destination;
a display device or a speaker, wherein the display device displays information regarding the travel route or the speaker provides audio information regarding the travel route; and
a receiver, wherein the receiver receives traffic information or information regarding a traffic condition, wherein the traffic information or the information regarding a traffic condition is transmitted from a computer, a transmitter, or a device, located at a location remote from the vehicle, wherein the apparatus provides the traffic information or the information regarding a traffic condition at the vehicle via the display device or via the speaker.

56. The apparatus of claim 55, wherein the apparatus detects a departure of the vehicle from the travel route, and further wherein the apparatus determines or identifies a second travel route to the destination, and further wherein the apparatus provides information regarding the second travel route.

57. The apparatus of claim 55, wherein the apparatus receives video information regarding the travel route or video information regarding a second travel route to the destination, and further wherein the apparatus provides the video information regarding the travel route or the video information regarding the second travel route.

58. The apparatus of claim 57, wherein the video information regarding the travel route or the video information regarding the second travel route is obtained with or by at least one camera located along, on, adjacent to, or near, the travel route or the second travel route.

59. The apparatus of claim 55, wherein the apparatus provides a video preview of the travel route or a video preview of a second travel route to the destination.

60. The apparatus of claim 55, wherein the apparatus receives information regarding a traffic forecast associated with the travel route or a traffic forecast associated with a second travel route to the destination, and further wherein the apparatus provides the information regarding the traffic forecast associated with the travel route or the traffic forecast associated with the second travel route.

61. The apparatus of claim 55, wherein the apparatus receives maintenance information associated with the travel route or maintenance information associated with a second travel route to the destination, and further wherein the apparatus provides the maintenance information associated with the travel route or the maintenance information associated with the second travel route.

62. The apparatus of claim 55, wherein the apparatus receives information regarding a weather condition, weather information, a forecasted weather condition, or a weather forecast, and further wherein the apparatus provides the information regarding the weather condition, the weather information, the forecasted weather condition, or the weather forecast.

63. The apparatus of claim 55, wherein the apparatus receives information regarding a news report, and further wherein the apparatus provides the information regarding the news report.

64. The apparatus of claim 55, wherein the display device is located or mounted on, or adjacent to, a dashboard of the vehicle or a console of the vehicle.

65. The apparatus of claim 55, further comprising:
a head-up display device, wherein the head-up display device displays information on a windshield of the vehicle.

66. The apparatus of claim 55, wherein the apparatus receives travel route information transmitted from a computer, a transmitter, or a device, located remote from the vehicle, and further wherein the apparatus provides the travel route information.

67. The apparatus of claim 55, further comprising:
a microphone and voice recognition software, wherein the microphone and the voice recognition software provides or facilitates a hands-free mode of apparatus operation.

68. The apparatus of claim 55, wherein the apparatus processes a request to provide video information from or associated with a selected location, wherein the selected location is located remote from the vehicle, wherein the apparatus receives the video information from or associated with the selected location, and further wherein the apparatus provides the video information via the display device or via a second display device.

69. A method, comprising:
processing, with a processing device, information regarding a location of a vehicle and information regarding a destination to which the vehicle can travel on at least one of a road, a roadway, a highway, a parkway, and an expressway;
determining or identifying, with the processing device or with a computer, a travel route to the destination;
displaying, via a display device, information regarding the travel route or providing, via a speaker, audio information regarding the travel route;
receiving, with a receiver, traffic information or information regarding a traffic condition, wherein the traffic information or the information regarding a traffic condition is transmitted from a computer, a transmitter, or a device, located at a location remote from the vehicle; and
providing the traffic information or the information regarding a traffic condition at the vehicle via the display device or via the speaker.

70. An apparatus, comprising:
a global positioning device, wherein the global positioning device determines a position or a location of the apparatus;
a processing device, wherein the processing device processes information regarding the position or the location of the apparatus and information regarding a destination, wherein the processing device determines or identifies a travel route to the destination on or along at least one of a road, a roadway, a highway, a parkway, and an expressway;
a display device or a speaker, wherein the display device displays information regarding the travel route or the speaker provides audio information regarding the travel route; and
a receiver, wherein the receiver receives traffic information or information regarding a traffic condition, wherein the traffic information or the information regarding a traffic condition is transmitted from a computer, a transmitter, or a device, located at a location remote from the apparatus, wherein the apparatus provides the traffic information or the information regarding a traffic condition via the display device or via the speaker.

71. The apparatus of claim 70, wherein the apparatus detects a departure from the travel route, and further wherein the apparatus determines or identifies a second travel route to the destination, and further wherein the apparatus provides information regarding the second travel route.

72. The apparatus of claim 70, wherein the apparatus receives video information regarding the travel route or video information regarding a second travel route to the destination, and further wherein the apparatus provides the video information regarding the travel route or the video information regarding the second travel route.

73. The apparatus of claim 72, wherein the video information regarding the travel route or the video information regarding the second travel route is obtained or recorded with or by at least one camera located along, on, adjacent to, or near, the travel route or the second travel route.

74. The apparatus of claim 70, wherein the apparatus provides a video preview of the travel route or a video preview of a second travel route to the destination.

75. The apparatus of claim 70, wherein the apparatus receives information regarding a traffic forecast associated with the travel route or a traffic forecast associated with a second travel route to the destination, and further wherein the apparatus provides the information regarding the traffic forecast associated with the travel route or the traffic forecast associated with the second travel route.

76. The apparatus of claim 70, wherein the apparatus receives maintenance information associated with the travel route or maintenance information associated with a second travel route to the destination, and further wherein the apparatus provides the maintenance information associated with the travel route or the maintenance information associated with the second travel route.

77. The apparatus of claim 70, wherein the apparatus receives information regarding a weather condition, weather information, a forecasted weather condition, or a weather forecast, and further wherein the apparatus provides the information regarding the weather condition, the weather information, the forecasted weather condition, or the weather forecast.

78. The apparatus of claim 70, wherein the apparatus receives information regarding a news report, and further wherein the apparatus provides the information regarding the news report.

79. The apparatus of claim 70, wherein the apparatus receives travel route information transmitted from a computer, a transmitter, or a device, located remote from the apparatus, and further wherein the apparatus provides the travel route information.

80. The apparatus of claim 70, further comprising:
a microphone and voice recognition software, wherein the microphone and the voice recognition software provides or facilitates a hands-free mode of apparatus operation.

81. The apparatus of claim 70, wherein the apparatus processes a request to provide video information from or associated with a selected location, wherein the selected location is located remote from the apparatus, wherein the apparatus receives the video information from or associated with the selected location, and further wherein the apparatus provides the video information via the display device.

82. The apparatus of claim 70, wherein the apparatus automatically detects a departure from the travel route, and further wherein the apparatus identifies a second travel route to the destination in response to the detected departure from the travel route, wherein the apparatus provides information regarding the second travel route.

83. The apparatus of claim 70, wherein the apparatus or the processing device determines a second travel route to the destination along or on a second at least one of a road, a roadway, a highway, a parkway, and an expressway, and further wherein the apparatus or the processing device identifies a first plurality of video cameras associated with the travel route and identifies a second plurality of video cameras associated with the second travel route, wherein each video camera of the first plurality of video cameras associated with the travel route and each video camera of the second plurality of video cameras associated with the second travel route is assigned to a location at least one of along, on, adjacent to, and near, the travel route or the second travel route, and further wherein the apparatus receives video information obtained from one or more video cameras of the first plurality of video cameras and receives video information from one or more video cameras of the second plurality of video cameras, and further wherein the display device displays the video information obtained from at least one video camera of the first plurality of video cameras or displays the video information obtained from at least one video camera of the second plurality of video cameras.

84. The apparatus of claim 70, wherein the display device displays a plurality of video images simultaneously.

85. A method, comprising:
determining a current position or a current location of a device or an apparatus, wherein the current position or the current location is determined with or using a global positioning device located at or in the device or the apparatus;
processing, with or using a processing device, information regarding the current position or the current location of the device or the apparatus;
identifying, with or using the processing device, a travel route to a destination on or along at least one of a road, a roadway, a highway, a parkway, and an expressway;
transmitting, from or with a transmitter, information regarding the travel route to the device or the apparatus; and
transmitting traffic information or information regarding a traffic condition to the device or the apparatus, or transmitting, to the device or the apparatus, information regarding a traffic forecast associated with the travel route or a traffic forecast associated with a second travel route to the destination, or transmitting, to the device or the apparatus, maintenance information associated with the travel route or maintenance information associated with a second travel route to the destination, or transmitting, to the device or the apparatus, information regarding a weather condition, weather information, a forecasted weather condition, or a weather forecast.

86. An apparatus, comprising:
a global positioning device for determining a position or a location of the apparatus;
a processing device for processing information regarding the position or the location of the apparatus and information regarding a destination, wherein the processing device is adapted to determine or identify a travel route to the destination on or along at least one of a road, a roadway, a highway, a parkway, and an expressway;

a receiver for receiving traffic information or information regarding a traffic condition; and a display device for displaying information regarding the travel route or a speaker for providing audio information regarding the travel route, wherein the apparatus is capable of providing the traffic information or the information regarding a traffic condition via the display device or via the speaker.

87. The apparatus of claim 86, wherein the apparatus is capable of being located or mounted on, in, or adjacent to, a vehicle dashboard or a vehicle console.

88. The apparatus of claim 86, further comprising:
a microphone; and
voice recognition software,
wherein the apparatus is capable of providing a hands-free mode of operation.

89. The apparatus of claim 86, wherein the apparatus is a computer, a laptop computer, a handheld computer, a palmtop computer, a television, an interactive television, a digital television, a personal digital assistant, a telephone, a digital telephone, a personal communication device, or a personal communications services device.

90. The apparatus of claim 86, wherein the apparatus is capable of receiving video information regarding the travel route or is capable of receiving video information regarding a second travel route, and further wherein the apparatus is capable of providing the video information regarding the travel route or the video information regarding the second travel route via the display device.

91. The apparatus of claim 86, wherein the apparatus is capable of detecting a departure from the travel route, and further wherein the apparatus is capable of providing information regarding the second travel route to the destination.

92. The apparatus of claim 86, wherein the apparatus is capable of providing a video preview of the travel route or a video preview of a second travel route to the destination.

93. The apparatus of claim 86, wherein the apparatus is capable of receiving information regarding a traffic forecast associated with the travel route or a traffic forecast associated with a second travel route to the destination, and further wherein the apparatus is capable of providing the information regarding the traffic forecast associated with the travel route or the traffic forecast associated with the second travel route.

94. The apparatus of claim 86, wherein the apparatus is capable of receiving maintenance information associated with the travel route or maintenance information associated with a second travel route to the destination, and further wherein the apparatus is capable of providing the maintenance information associated with the travel route or the maintenance information associated with the second travel route.

95. The apparatus of claim 86, wherein the apparatus is capable of receiving information regarding a weather condition, weather information, a forecasted weather condition, or a weather forecast, and further wherein the apparatus is capable of providing the information regarding the weather condition, the weather information, the forecasted weather condition, or the weather forecast.

96. The apparatus of claim 86, wherein the apparatus is capable of receiving information regarding a news report, and further wherein the apparatus is capable of providing the information regarding the news report.

97. The apparatus of claim 86, wherein the apparatus is capable of receiving travel route information transmitted from a computer, a transmitter, or a device, located remote from the apparatus, and further wherein the apparatus is capable of providing the travel route information.

98. The apparatus of claim 86, wherein the apparatus is a wireless device.

* * * * *